(12) United States Patent
Koloc

(10) Patent No.: US 6,396,213 B1
(45) Date of Patent: May 28, 2002

(54) APPARATUS FOR GENERATING A COMPOUND PLASMA CONFIGURATION WITH MULTIPLE HELICAL CONDUCTOR ELEMENTS

(76) Inventor: Paul M. Koloc, 9903 Cottrell Ter., Silver Spring, MD (US) 20903

( * ) Notice: Subject to any disclaimer, the term of this patent is extended or adjusted under 35 U.S.C. 154(b) by 0 days.

(21) Appl. No.: 09/046,709

(22) Filed: Mar. 24, 1998

Related U.S. Application Data

(63) Continuation of application No. PCT/US96/15474, filed on Sep. 24, 1996.
(60) Provisional application No. 60/004,256, filed on Sep. 25, 1995, provisional application No. 60/004,255, filed on Sep. 25, 1995, and provisional application No. 60/004,287, filed on Sep. 25, 1995.

(51) Int. Cl.[7] .................................................. H05H 1/02
(52) U.S. Cl. .............................. 315/111.21; 313/231.31
(58) Field of Search .................. 315/111.21; 313/231.31

(56) References Cited

U.S. PATENT DOCUMENTS

| | | | |
|---|---|---|---|
| 3,303,097 A | 2/1967 | Mallinckrodt | |
| 3,321,664 A | 5/1967 | Phillips et al. | 315/111.21 |
| 3,579,028 A | 5/1971 | Paine et al. | 315/111.21 |
| 3,720,885 A | 3/1973 | Koloc | 313/329 X |
| 3,886,402 A | 5/1975 | Furth et al. | 315/111.71 |
| 3,922,554 A | 11/1975 | Koloc | 250/461 |
| 3,927,323 A | 12/1975 | Koloc | 250/329 |
| 4,023,065 A | 5/1977 | Koloc | 315/111.21 |
| 4,182,650 A | 1/1980 | Fischer | |
| 4,795,879 A | 1/1989 | Hull et al. | |
| 4,891,180 A | 1/1990 | Koloc | |
| 5,015,432 A | 5/1991 | Koloc | |
| 5,041,760 A | 8/1991 | Koloc | |
| 5,211,142 A * | 5/1993 | Matthews et al. | 313/143 X |
| 5,399,832 A * | 3/1995 | Tanisaki et al. | 219/121.47 |

FOREIGN PATENT DOCUMENTS

| | | |
|---|---|---|
| CA | 1065505 | 10/1979 |
| DE | 1 022 711 | 1/1958 |
| GB | 892344 | 3/1959 |

OTHER PUBLICATIONS

"Ball Lightning: What Nature Is Trying to Tell The Plasma Research Community", J. Reece Roth, University of Tennessee, Knoxville, Tennessee, Fusion Technology, vol. 27, May 1995, pp. 255–270.
"Design of a pulsed deuterium lithium nuclear reactor", A. Fischer, Atomkernenergie, vol. 23, No. 1, pp. 66–68, 1974.
"The Plasmak: Its Unique Structure, The Mantle", Paul M. Koloc, et al; Presented at the Third Symposium on the Physics and Technology of Compact Toroids in the Magnetic Fusion Energy Program, Los Alamos Scientific Laboratory, Dec. 2–4, 1980.
"The All Plasma Spheromak: The Plasmak", Paul. M. Koloc, et al; Presented at the Symposium on Compact Toruses and Energetic Particle Injection Sponsored under the US—Government of Japan Agreement on Cooperation in Research and Development in Energy and Related Fields, Princeton University, Dec. 12–14, 1979.
"Plasmak Star Power for Energy Intensive Space Applications"; Paul M. Koloc, Eighth ANS Topical Meeting on Technology of Fusion Energy, Special Issue Fusion Technology, Mar. 1989.

(List continued on next page.)

Primary Examiner—Justin P. Bettendorf
(74) Attorney, Agent, or Firm—Oblon, Spivak, McClelland, Maier & Neustadt, P.C.

(57) ABSTRACT

A compound plasma configuration can be formed from a device having pins, and an annular electrode surrounding the pins. A cylindrical conductor is electrically connected to, and coaxial with, the annular electrode, and a helical conductor coaxial with the cylindrical conductor. The helical conductor is composed of wires, each wire electrically connected to each pin. The annular electrode and the pins are disposed in the same direction away from the interior of the conducting cylinder.

22 Claims, 14 Drawing Sheets

OTHER PUBLICATIONS

"Axially Symmetric Force–Free Plasmoids"; D.R. Wells, Phys. Fluids, 7, 826 (1964).

"The Universe"; David Bergamini, Time–Life Books, Life Nature Library, 1962, pp. 101–103.

"Compression of a Dense Toroidal Plasma With a $\beta$> 1 Gas Piston"; Proc. $5^{th}$ IAEA Conference on Plasma Physics and Controlled Fusion, Paper CN–33/H8–2. Tokyo (1975).

"Pulsed Toroidal System with Automated Confinement Chamber"; A.G. Es'Kov, Kurtmullaev, et al, Proc. $5^{th}$ IAEA Conference on Plasma Physics and Controlled Fusion, Paper IAEA–CN–33/E5. Tokyo (1975).

"Magnetohydrodynamical Equilibrium Configurations"; V.D. Shafranov, J. Exptl. Theoret. Phys., 33, 710 (1957). Translation in Soviet Physics—JETP, 6, 545 (1958).

"On the Amplification of the Poloidal Magnetic Flux in a Plasma"; L. Lindberg et al, Royal Institute of technology, Stockholm, Sweden, Oct., 1960.

"Magnetohydrodynamics and the Thermonuclear Problem", H. Alfven, $2^{nd}$ U.N. Conference for Peaceful Uses of Atomic Energy, vol. 31, 1976.

"New Type of Collective Accelerator"; Charles W. Hartman, et al, The American Physical Society, vol. 48, No. 14, Apr. 1982.

"MHD Equilibrium and Stability of the Spheromak"; M. Okabayashi et al, Princeton Plasma Physics Laboratory, Princeton University, *Nuclear Fusion*, vol. 19, No. 4, (1979).

"MHD Stability of Spheromak"; M.N. Rosenbluth, et al, Nuclear Fusion, vol. 19, No. 4 (1979).

"The Compact Torus"; H.P. Furth, Vacuum Society Meeting, Oct., 1980.

"Formation of a Spheromak Plasma Configuration"; G.C. Goldenbaum, et al, Physical Review Letters, vol. 44, No. 6, Feb. 1980.

"Low–Aspect–Ratio Limit of the Toroidal Reactor: The Spheromak"; M.N Bussac, et al, 1978.

"Project TESLA"; Robert Golka, Technology Today, Feb., 1981.

"Progress Toward a Tokamak Fusion Reactor", Harold P. Furth, Scientific American, vol. 241, No. 2, Aug. 1979.

"Establishment of an Advisory Panel on Fusion Energy", Fusion Forefront—A newsletter from the DOE/Office of Fusion Energy, Sep. 1979.

"Fusion Implications of Free–Floating PALSMAK Magnetoplasmoids", first International Symposium on Evaluation of Current Trends in Fusion Research, Nov. 14, 1994.

"The PLASMAK Configuration and Ball Lightning"; Paul M. Koloc, Presented at the International Symposium on Ball Lightning, Jul. 1988, Tokyo, Japan.

"Ball Lightning as Self–Organization Phenomenon"; B.B. Kadomtsev, Research Report, NIF Series, Feb., 1995.

"Ball Lightning as a Route to Fusion Energy"; J. Reece Roth, Paper 29–P–14 presented at the $13^{th}$ Symposium on Fusion Engineering, Oct. 2–6, 1989.

"Reconnection in Spheromak Formation and Sustainment"; James H. Hammer, Proceedings for the AGU Chapman Conference on Magnetic Reconnection, Los Alamos National Laboratory, Los Alamos, NM, Oct. 3–7, 1983.

"Thermal Equilibrium and Stability of Tokamak Discharges"; H.P. Furth, et al, The Physics of Fluids, vol. 13, No. 12, Dec. 1970.

"Adiabatic Compression of Tokamak Discharges"; H.P. Furth, et al, The Physics of Fluids, vol. 13, No. 10, Oct. 1970.

"Controlled Thermonuclear Reactions" An Introduction to Theory and Experiment, Samuel Glasstone et al, 1960, pp. 1–45, 404–413.

"Introduction to Solid State Physics", Charles Kittel, $4^{th}$ Edition, 1971, pp. 239–292.

"Toroidal Hydromagnetic Equilibrium Solutions with Spherical Boundaries"; G.K. Morikawa et al, Physics of Fluids, vol. 13, No. 2, Feb. 1979.

"Double–Toroidal Hydromagnetic–Equilibrium Configurations within a perfectly Conducting Sphere"; G.K. Morikawa, The Physics of Fluids, vol. 12, No. 8, Aug. 1969.

"Equilibrium and Decay of a Reversed Magnetic Field Configuration produced by a Rotating Relativistic Electron Beam"; J.D. Sethian, et al, 1979.

"Application of the Virial Theorem to Equilibria of Toroidal Plasmas"; Soichi Yosukawa, The Physics of Fluids, vol. 7, No. 2, Feb. 1964.

Spheromak Presentation, Aug. 9, 1979.

Fusion Power By Magnetic Confinement, 1975.

Session DA: International Symposium on Plasma, Fluids, and Fusion Physics, Advances in Inertial Plasma Confinement, Apr., 29, 1986.

"The Compact Torus"; H.P. Furth, Plasma Physics Laboratory, Oct., 1980.

Quote of Yoshikawa, 1964.

Quote of Sweet, 1958.

Quote of Shafranov, 1970.

Quote of Kurtmullaev, et al, 1975.

Quote of Furth–Yoshikawa, 1970.

Quote of Furth, Rosenbluth, Rutherford and Stodiek, 1970.

"Tokamak Devices"; L.A. Artsimovich, et al, Nuclear Fusion 12, 1972, pp. 215–252.

"Introduction to Plasma Physics", Francis F. Chen, 1974, pp. 13–16.

"Introduction to Controlled Fusion", Francis F. Chen, 1974, Chapter 9 of Introduction to Plasma Physics, pp. 279–319.

"Gaseous Conductors—Theory and Engineering Applications"; James Dillon Cobine, Ph.D., 1941, pp. 131–135.

"Plasma Heating by Adiadatic Compression"; R.A.Ellis, Jr, pp. 140–147, 1976.

"Tokamak Research"; H.P. Furth, Nuclear Fusion 15 (1975) pp. 487–534.

"The PMK—A Compound Plasma Configuration"; Paul M. Koloc, 1975.

"Thermonuclear PMK Power Generator"; Paul M. Koloc, proposal, 1977.

"Total Energy of a Pressure–Confined Plasmoid", Douglas M. Eardley, Jan., 1990.

"Response to DARPA/JASON Queries on Phaser Corporation Plasmak™ Plasmoid", Paul M. Koloc, 1990.

Letter to Dr. Marshall Rosenbluth, May 23, 1990, Paul M. Koloc.

"Formation of the PMK"; Paul M. Koloc, proposal with additional comments and references, 1978.

"A Qualitative Introduction to a New Concept for Fusion"; Paul M. Koloc, 1977, with attached letter.

"Plasmak Preliminary Investigations and Existence Experiment (PPI/PEX)"; C.N.Boyer, et al, vol. I, Technical Proposal, 1979.

Plasmak Preliminary Investigations and Existence Experiment (PPI/PEX); C.N. Boyer, et al, vol. III, Cost Proposal, 1979.

"Plasmak Preliminary Investigations and Existence Experiment (PPI/PEX); Paul M. Koloc, vol. IV, Replies to Reviewers" Comments, 1980.

"Plasmak Preliminary Investigations and Existence Experiment (PPI/PEX)"; C.O. Butterfield, et al, vol. V, Proposed Credibility Study to Establish Technical Merits of PPI/PEX Proposed Plasmak and Replies to Evaluators' Comments, 1980.

"Notes from Observatories"; P.A. Sweet, Feb. 1958.

"Plasmak™ Technology", Sep. 1985.

Letter to Gen. Arch A. Sproul, Sep. 18, 1985, from Paul M. Koloc.

"The National Magnetic Fusion Program"; Senator Pete V. Domenici, Nov., 1984.

Testimony Before the House Science and Technology Committee Energy Research and Production Subcommittee on the FY 1986 Magnetic Fusion Energy Budget; Pau. M. Koloc, Mar. 18, 1985.

"Fusion's Problems"; Tusla World Oklahoma, Jan., 1984.

"The Trouble With Fusion"; Lawrence M. Lidsky, Physics and Society, vol. 13, No. 3, Jul., 1984.

"Whither Fusion Research?"; Robert L. Hirsch, speech delivered to the ANS $6^{th}$ Topical Meeting on the Technology of Fusion Energy, Mar., 1985.

"Developing Crisis Seen in Costly Trend Toward Big Machines"; William J. Broad, New York Times, Jun. 11, 1985.

Atomic Industrial Forum Committee on Fusion—Statement by Robert W. Goodrich Before the Fusion Study Group of the Department of Energy's Energy Research Advisory Board, May 23, 1980.

Fusion Power Report, Charter Issue, 1980.

Phaser Activities Update; Paul M. Koloc, Aug., 1988, with attachments.

"Conceptual Analysis of an Ideally Compact Advanced Fusion Device"; Pau. M. Koloc, Small business Innovation Research Solicitation No. DOESBIR 86–1, Jan., 1986.

"Multigigawatt Fusion Space Power with 95% Efficient Inductove MHD Generator"; Paul M. Koloc, Defense Small Business Innovation Research (SBIR) Program, Jan., 1986.

"Ram Compressed Magneto Plasmoid (RCMP): An Innovative DEW"; Paul M. Koloc, Defense Small Business Innovation Research (SBIR) Program, Jan. 1986.

"High Payload Fusion Powered Rocket Engines for Boost and Pursuit Craft"; Paul M. Koloc, Defense Small Business Innovation Research (SBIR) Program, Jan., 1986.

"The Plasmak™ Configuration: A High Density Thermonuclear Power Generator"; Paul M. Koloc, Small Business Innovation Research Solicitation No. DOE/SBIR 83–1, Mar., 1983.

"Plasmak™ Formation"; Paul M. Koloc, Defense Small Business Innovation Research (SBIR) Program, Jan., 1984.

"Conceptual Analysis of an Advanced Fusion Power Generator: The Plasmak"; Paul M. Koloc, Small Business Innovation Research Solicitation No. DOE/SBIR 84–1, Mar., 1984.

"The Plasmak™ Configuration: A Coherent Magnetized Plasmoid for Hyperkinetic Acceleration"; Paul M. Koloc, Draft of Unsolicited Proposal Submitted to Air Force Office of Scientific Research, Air Force Systems Command, United States Air Force, Aug., 1983.

"A Coherent Magnetized Plasmoid"; Paul M. Koloc, Unsolicited Proposal Submitted to Air Force Office of Scientific Research Air Force Systems Command, United States Air Force, Sep., 1983.

"Getting Nuked"; Phil Patton, Omni Magazine, 1987.

National Academy of Sciences, National Research Council, Commission of Engineering and Technical Systems, Air Force Studies Board, Committee on Aneutronic Fusion Power, Phase I, Agenda, 1986.

"SDI: Progress and Challenges"; Douglas Waller, et al, Staff Report Submitted to Senator William Proxmire, Senator J. Bennett Johnston and Senator Lawton Chiles, Mar., 1986.

A High Density Gas Confined Spheromak (Spheroidal Mantle and Kernel); Paul M. Koloc, Report Prepared for Meting at Department of Energy, Alternate Concepts Development Program, Oct., 1979.

"Fusion Enterprise"; Paul M. Koloc, Report prepared for private industry, 1981.

"Fusion Enterprise"; Paul M. Koloc, Report prepared for Litton Industries, 1981.

"Briefing on Fusion"; Paul M. Koloc, 1984.

"Conference on Industry's Role in Development of Fusion Power"; Clinton P. Ashworth, et al, Feb. 1984.

"Power for the Strategic Defense Initiative" A White Paper; Paul M. Koloc, May 30, 1985.

Prospectus—Industrial Fusion Consortium, Feb., 1982.

"Controlled Thermonuclear Fusion—Evolution to Plasmak"—Draft for Internal Review, Sep. 1, 1982.

SDI Office Pushes Innovative Science, Technology Research; Philip J. Klass, 1985.

"Fusion Power—Its Status and Prospects", Energy folder prepared by IEEE Energy Committee, 1984.

College Physics, Francis Weston Sears et al, Second Edition, 1947, p. 762–763.

"Aneutronic Plasmak™ Technology and Development" Technical Presentation to the USAF Fusion Power and Propulsion Evaluation Program, Mar. 14, 1988.

"$20 Billion Voted for Nuclear Fusion", New York Times, Aug. 1980.

"Inertial Confinement Fusion Using Magnetized Targets", Fusion, Dec. 1980.

"Science and Technology"; Janet Raloff, Science News, vol., 118, Nov. 15, 1980, pp. 314–315.

"Recreating the Power of the Sun"; Jeremy Bernstein, New York Times Magazine, Jan. 3, 1982.

"Taming a Star—A report from the Land of Fusion—practical power of physicists' dream"; Tracy Kidder, Science, Mar. 1982.

"Ball Lightning Now Seems More Fact Than Fiction"; Malcolm W. Browne, New York Times, 1969.

"Fusion For Profit"; Herb Brody, High Technology, Nov. 1984.

"Magnetically Insulated Inertial Fusion—A Hybrid Fusion Scheme"; Akira Hasegawa, AT & T Bell Laboratories, 1987.

Testimony Before the House Science and Technology Committee Energy Research and Production Subcommittee, on the FY 1986 Magnetic Fusion Energy Budget, Mar. 18, 1985.

"Plasmak™ Market Potential"; 1994.

Letter from William F. Dove to Paul M. Koloc, Jan. 28, 1980.

Letter from Paul M. Koloc to Ronald Kostoff, Jan. 31, 1980.

Letter from Paul M. Koloc to Jeff Ringer, Apr. 24, 1980.

Letter from Paul M. Koloc to the Magnetic Fusion Study Group, May 23, 1980, with attachments "A Practical Route To Fusion Power With the Spheromak" by Gregory J. Maier.

Letter from Paul M. Koloc to James F. Decker, Aug. 29, 1980.

Letter from Paul M. Koloc to William F. Dove, Aug. 12, 1980, with attachment "Cyclotron Power Calculations".

Letter from James F. Decker to Paul M. Koloc, Aug. 19, 1980.

Letter from Robert M. Salter to Paul M. Koloc, Aug. 20, 1980.

"Fusion Implications of Free–Floating PLASMAK™ Magnetoplasmoids"; Paul M. Koloc, First International Symposium on Evaluation of Current Trends in Fusion Research, Nov. 14, 1994.

Photographs published at www.skypoint.com (3 pages), 1994, Paul M. Koloc.

World Wide Web Publication at www.skypoint.com, Paul M. Koloc, Feb. 7, 1995.

World Wide Web Publication, "Dr. Arthur Carlson's Critique of the plasmak", 1994.

World Wide Web Publication, "Plasmak(tm) Tutorial", as interpreted by John Logajan, Apr. 18, 1995.

Letter from Paul M. Koloc to Paul H. Rutherford, Jul. 14, 1981.

Letter from Paul H. Rutherford to Paul M. Koloc, Jul. 2, 1981, with attachment "Definitions".

Letter from Paul M. Koloc to General Arch Sproul, Feb. 16, 1984, with attachment "Plasmak™ Formation".

World Wide Web Publication at plasmak.txt at www.skypoint.com, Paul M. Koloc, Mar. 5, 1995.

Plasmak™ Poser and Propulsion System ($P^3S$), presentation to the Strategic Defence Initiative Office, Jul. 7, 1988.

Executive Newsletter, "Fusion Power Associates", Jul. 1985.

"Low Budget Fusion", Omni, Jun. 1986, Bill Lawren.

Letter from Paul M. Koloc to Ryszard Gajewski, Aug. 15, 1986.

"A Generator of Lightning–Like Ideas"; Charles Hillinger, The Washington Post, Jun. 3, 1979.

"NRL scientists achieve significant breakthrough"; The Navy News, Jan. 3, 1980.

Briefing on Fusion; Paul M. Koloc, Dec. 29, 1983.

"Plasmak™ Fusion" Introductory, Paul M. Koloc, 1994.

A Proposal for Plasmak Research, presented by Prof. J. Reece Roth for the BDM Corporation and The Phaser Corporation, Jul. 8, 1988.

"The Plasmak™ Concept", Presentation to the JASON Committee, Jan. 17, 1990, Paul M. Koloc.

* cited by examiner

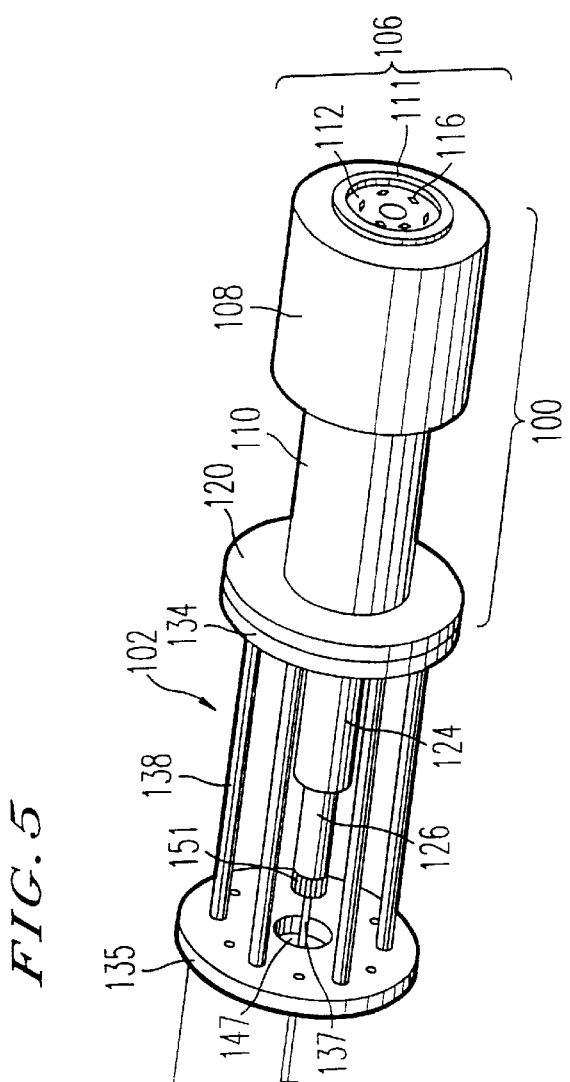
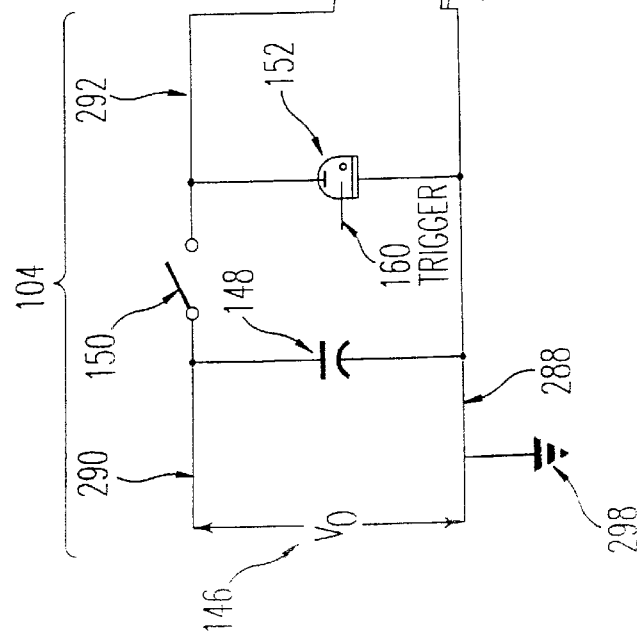
FIG. 5

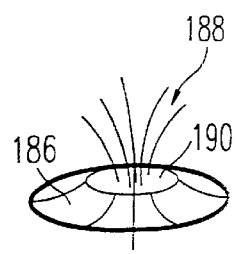
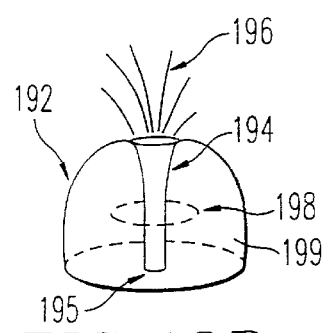
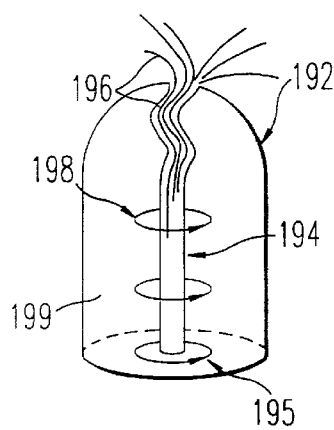
FIG. 12A
FIG. 12B
FIG. 12C
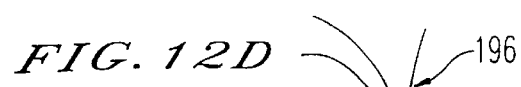
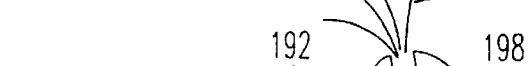
FIG. 12D
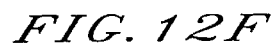
FIG. 12F
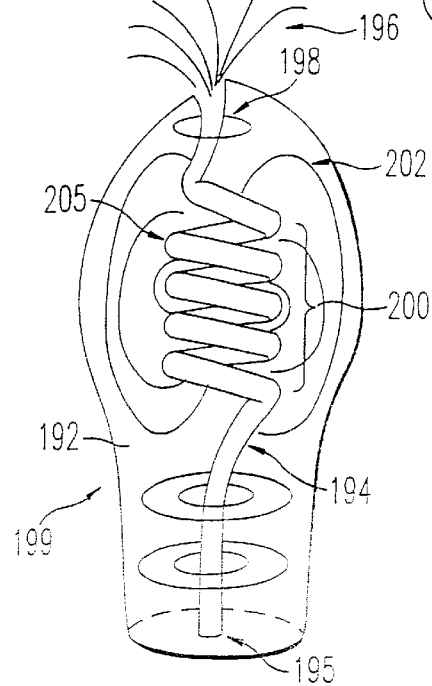
FIG. 12E
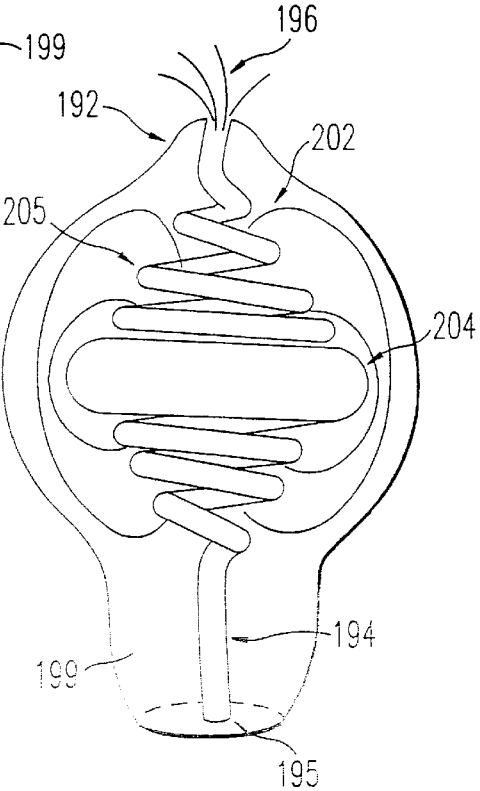

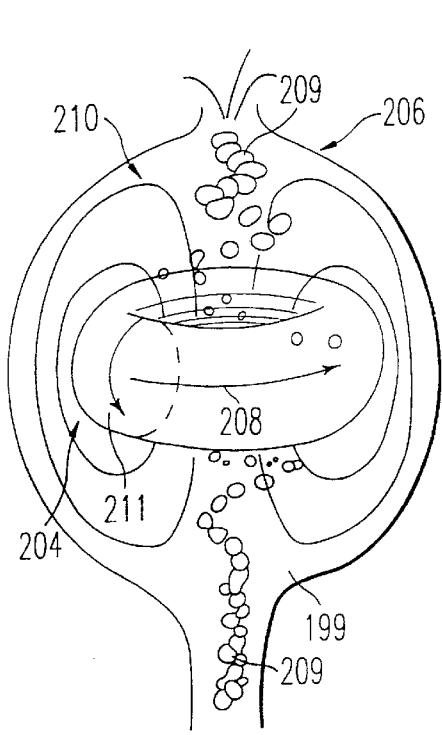
FIG. 12G
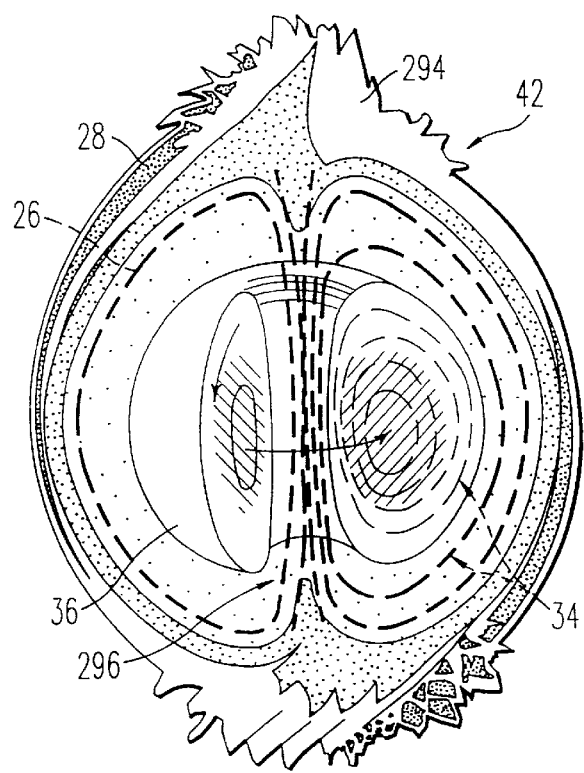
FIG. 12H
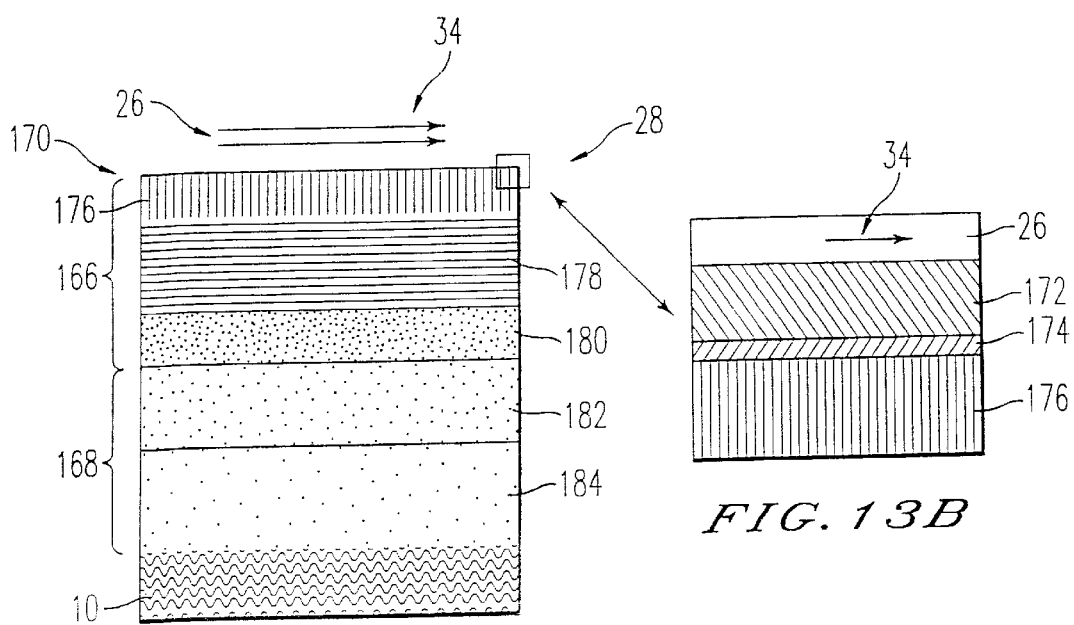
FIG. 13A
FIG. 13B

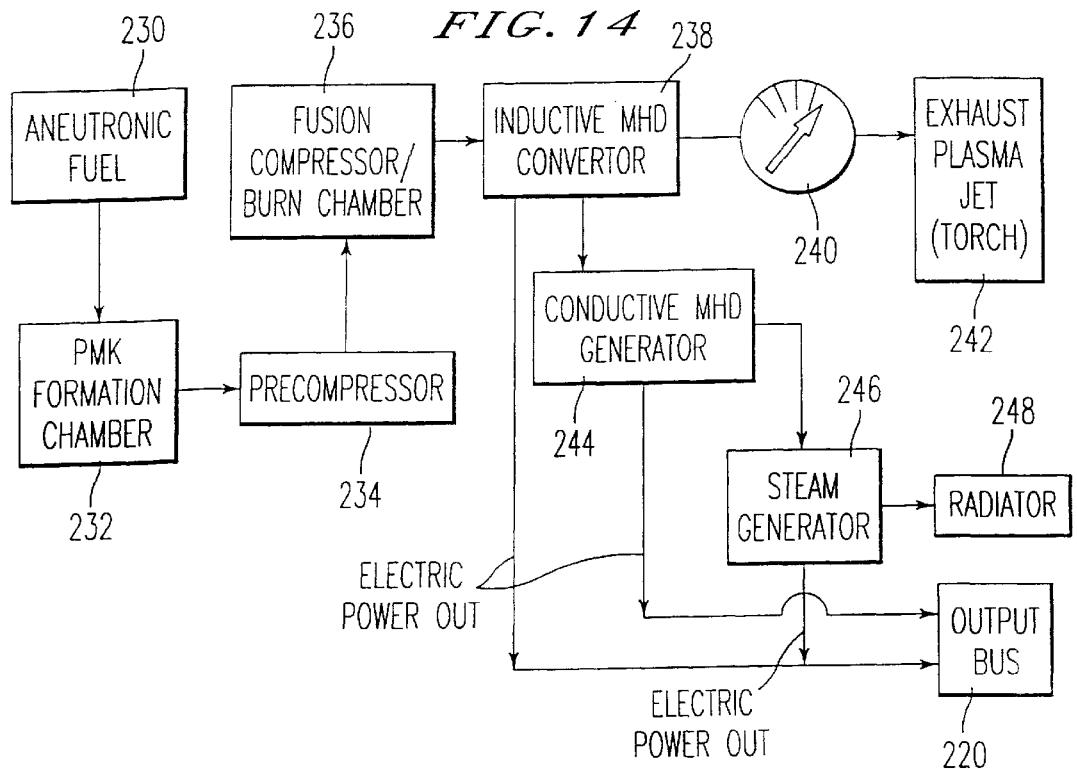
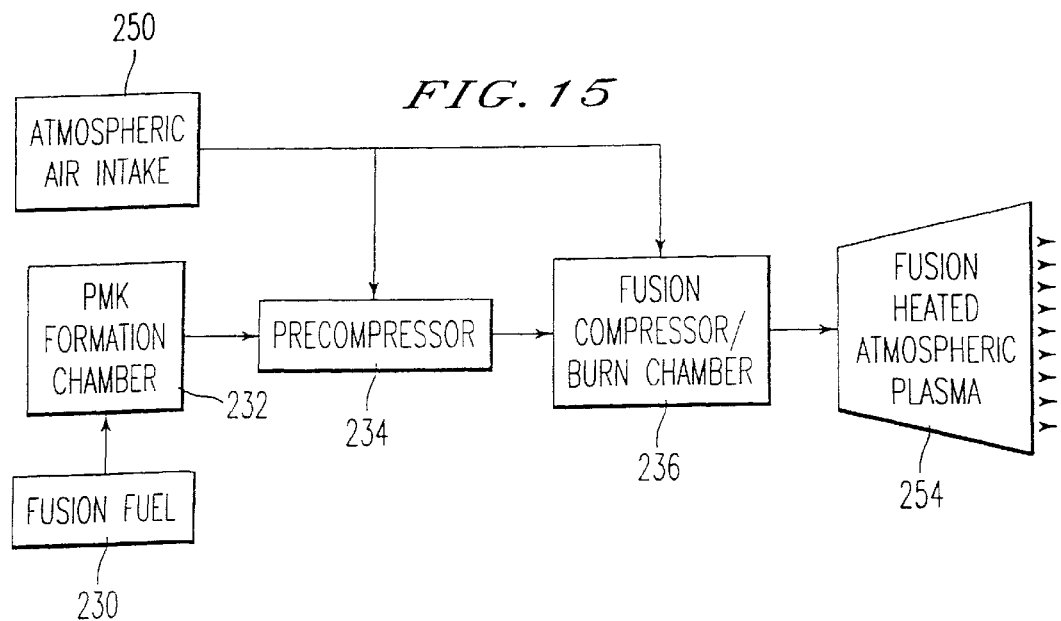

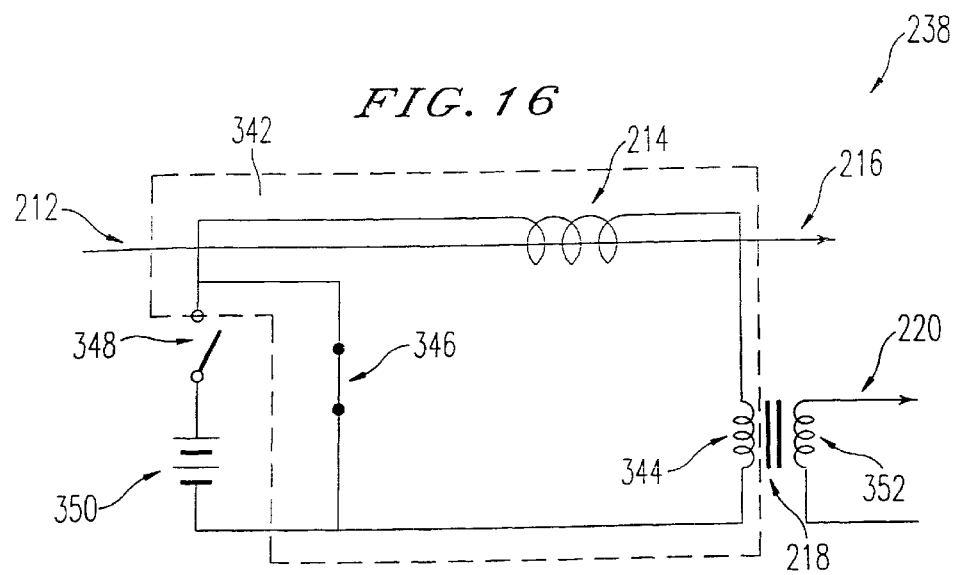
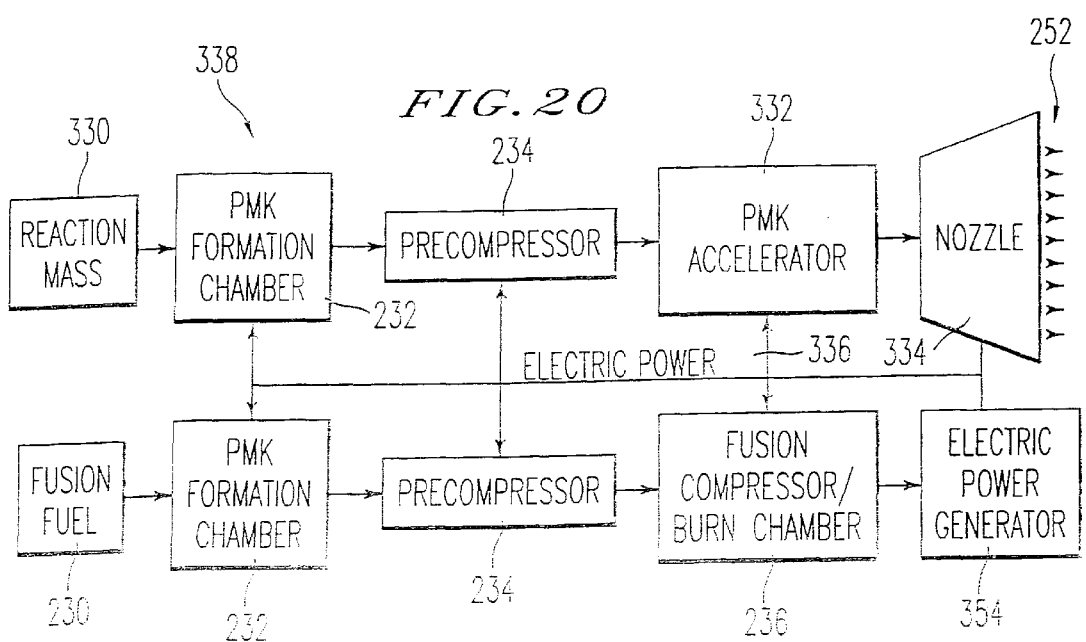

APPARATUS FOR GENERATING A COMPOUND PLASMA CONFIGURATION WITH MULTIPLE HELICAL CONDUCTOR ELEMENTS

This application is a Continuation of International Application No. PCT/US96/15474, filed on Sep. 24, 1996 which claims the benefit of U.S. Provisional Application Nos. 60/004,256, filed on Sep. 25, 1995, 60/004,255, filed Sep. 25, 1995 and 60/004,287, filed on Sep. 25, 1995.

BACKGROUND OF THE INVENTION

1. Field of the Invention

The present invention relates to a method and apparatus for forming a compound plasma configuration, as well as a new compound plasma configuration.

2. Discussion of the Background

A compound plasma configuration, also known as a PMK (Plasma Mantle-Kernel) configuration has been described in U.S. Pat. Nos. 4,023,065; 4,891,180; 5,015,432; and 5,041,760. The structure of the PMK is shown in FIGS. 1 and 2 taken from U.S. Pat. No. 4,023,065. As described in that patent, the PMK 42 has three major regions: an inner kernel 36, a vacuum field region 26, and a mantle 28. Inner kernel 36 is a single toroidal current loop. The mantle 28 is composed of ionized material and is surrounded by a fluid 10, such as an atmosphere of gas. The vacuum field region 26, separates the mantle and the kernel.

FIGS. 3 and 4 also taken from U.S. Pat. No. 4,023,065, provide more detail of the inner kernel. The plasma kernel 36 produces a poloidal magnetic field within and around it, illustrated by flux lines 34. A circular surface current 38 circulates about the minor axis throughout the volume of the toroidal kernel. These currents 38 result in a toroidal magnetic field within the heart of the kernel 36, represented by flux lines 40.

The mantle 28 has a generally ellipsoidal shape surrounding the kernel 36, substantially as shown in FIG. 1. This configuration is a substantially stable one in that the kernel 36 exists in a vacuum field region 26 and thus does not dissipate rapidly. The kernel current also produces a strong poloidal field, represented by the flux lines 34 supporting the ionized particles in the mantle 28. This prevents the mantle 28 from collapsing into the vacuum field region 26. However, the mantle 28 is prevented from expansion because the pressure of the internal poloidal field reaches equilibrium with a fluid pressure of the external fluid 10.

A weak poloidal current 44 may exist which circulates around the mantle 28 threads through the center of the toroidal kernel 36 following the flux lines of the poloidal field generated by the kernel 36, as illustrated in FIG. 2. The poloidal current 44 results in the formation of a toroidal field within the vacuum field region 26, as illustrated by flux lines 46. The sum of the toroidal and poloidal fields is not shown.

The vacuum field region within the PMK hinders the kernel current from losing conductivity due to diffusion of current particles. As a result the kernel may exist for a period of time during which its energy losses are limited to high temperature radiation to the mantle.

The plasma configuration does not depend on any external electric or magnetic fields for its existence or stability. Rather it is similar to a charged battery in that it is able to internally store or retain magnetic energy for a period of time depending on its conductivity, surrounding fluid pressure, and its internal energy content. The charged particles forming the ionized mantle generally will not penetrate the intensive poloidal field generated by the circulating current forming the kernel. Thus physical fluid pressure can be exerted on the mantle for compressing the mantle. However, compression of the mantle will force compression of the poloidal field, and will result in increasing the energy and temperature of the kernel. Accordingly, the internal temperature and energy of the PMK, a plasma, may be increased by applying mechanical fluid pressure to the exterior surface of the mantle. If a gas or liquid is used to apply fluid pressure to the mantle, particles will diffuse through and penetrate the mantle, however, these particles will become ionized as they are exposed to the intense heat radiated by the kernel. Thus, in effect, these particles will become part of the mantle and will be unable to penetrate the magnetic field within the PMK in large quantities. Therefore, the near vacuum conditions in the vacuum field region will be maintained by the inherent internal energy of the compound plasma configuration. Thus the PMK is unique in that it establishes an interface between mechanical pressure and a circulating plasma current.

Previously a PMK could be generated by creating a helical ionized region in a gas, and then passing a large current through this ionized region., as described in the prior art patents referenced above. The resulting helical current collapses, forming the inner toroidal kernel as well as the outer mantle. However, this method inefficiently applied a large amount of energy simultaneously to a substantial volume of the media in which the PMK would be formed. Consequently, the energy applied to each small volume of the region was reduced, and thus the effective energizing of the media was slower and required more time.

As noted, these previous processes were somewhat unreliable. Furthermore, an apparatus necessary to generate a PMK in this fashion is rather complex, requiring a separate power source for generating a helical ionized region in the gas, such as a plasma gun or a flash lamp, in addition to a high voltage source for passing current through the ionized region. Furthermore, this apparatus is quite inductive from the outset, due to its size, thus retarding the rise time of the current at initiation.

The compound plasma configuration produced by these earlier methods also lacked in total lifetime and stability. Generally, a compound plasma configuration having closed inductive circuits, may have a decay time that is the product of its characteristic inductance and conductivity. The inductance of the plasmoids is generally fixed, and therefore the lifetime of a ten centimeter diameter plasmoid will vary with its conductivity. The compound plasma configurations generated previously had lifetimes on the order of a few microseconds. For example, such compound plasma configurations have been described in a publication by Daniel R. Wells, Paul Edward Ziajka, and Jack L. Tunstall, *Hydrodynamic Confinement of Thermonuclear Plasmas TRISOPS VIII (Plasma Linear Confinement)*, Fusion Tech. 9:83 (1986). In this case plasma rings were generated from two opposing plasma guns which were magnetically repelled towards each other and merged centrally and co-axially with a theta pinch compression coil. When the theta pinch coil was fired, it generated a typical compression wave from the pre-ionized background plasma. In the cases where a pre-existing axial magnetic guide field was not generated, the collapsing plasma pressure wave was timed to intercept and crush the merged magnetic plasma ring, thus forming a compound plasma configuration. This compound plasma configuration was naturally compression heated to high peak pressures which arose from the inertially driven compression wave, igniting a fusion reaction in the deuterium fuel. However, because of the very short lifetime (1 microsecond) of the initially merged ring, the very strong compressional energizing of the plasma could not extend fusion reaction times sufficiently to generate a break even fusion burn. This demonstrates the need for a compound plasma configuration with a greater lifetime and stability.

SUMMARY OF THE INVENTION

An object of the present invention is to provide a simple device which can reliably generate a PMK.

Another object of the present invention is to provide a simple method for generating a PMK.

A further object is to provide a device and method which can reliably and reproducibly prepare a PMK.

A further object is to provide a new compound magnetized plasma configuration with a long lifetime.

A further object is to provide uses for a new compound magnetized plasma configuration.

These objects are provided by a device, comprising a conductive cylinder having an open end, an annular electrode, a plurality of pins, and a helical conductor having an open end and comprising a plurality of wires. The pins are each electrically connected to each of the wires, and protrude from the open end of the helical conductor. The annular electrode is electrically connected to the conducting cylinder. The helical conductor is coaxial with the conducting cylinder, and the pins are disposed away from an interior of the helical conductor and are encircled by the annular electrode.

These objects are also provided by a method of producing a compound plasma configuration, comprising driving a current through a plasma while simultaneously generating a magnetic field, and inflating the plasma with the magnetic field.

In addition, these objects can also be provided by a compound plasma configuration comprising a kernel, a vacuum field region and a mantle, wherein the kernel and the mantle have hyperconducting electric currents.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 5 is a perspective illustration of a source and a coaxial mounting bus with the impulse circuit for generating a compound plasma configuration, shown schematically.

FIGS. 12a through 12h illustrate the inflation sequence of a plasma to form a compound plasma configuration (PMK).

FIG. 13 and 13B are cross sectional illustration of the mantle of the PMK according to the invention.

FIG. 14 is a block diagram of an electrical power generating system employing the invention.

FIG. 15 is a block diagram of a thermal thrust engine according to the invention.

FIG. 16 is a schematic of an inductive MHD convertor.

FIG. 20 is a block diagram of a PMK hyperdrive according to the invention.

DETAILED DESCRIPTION OF THE INVENTION

An example of a device and additional supporting structures are described in FIG. 5. FIG. 5 illustrates three parts: a source 100, mounted to a coaxial mounting bus 102 which in turn is connected to an impulse circuit 104. The source is the device which forms a compound plasma configuration (PMK). The coaxial mounting bus is a convenient way to attach the source to the impulse circuit and allow for linking of the axial flux produced in the source through the forming PMK. The impulse circuit is one way to drive the source in order to form a compound plasma configuration.

Figure 1:
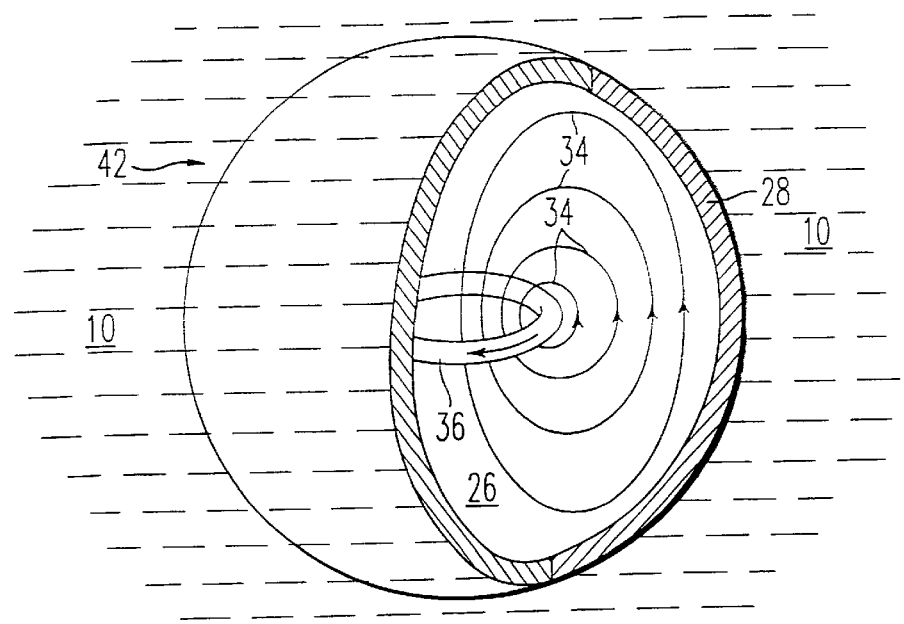
FIGS. 1 and 2 show the parts of the compound plasma configuration (PMK) formed according to the invention, and are reproduced from U.S. Pat. No. 4,023,065.
Figure 2:
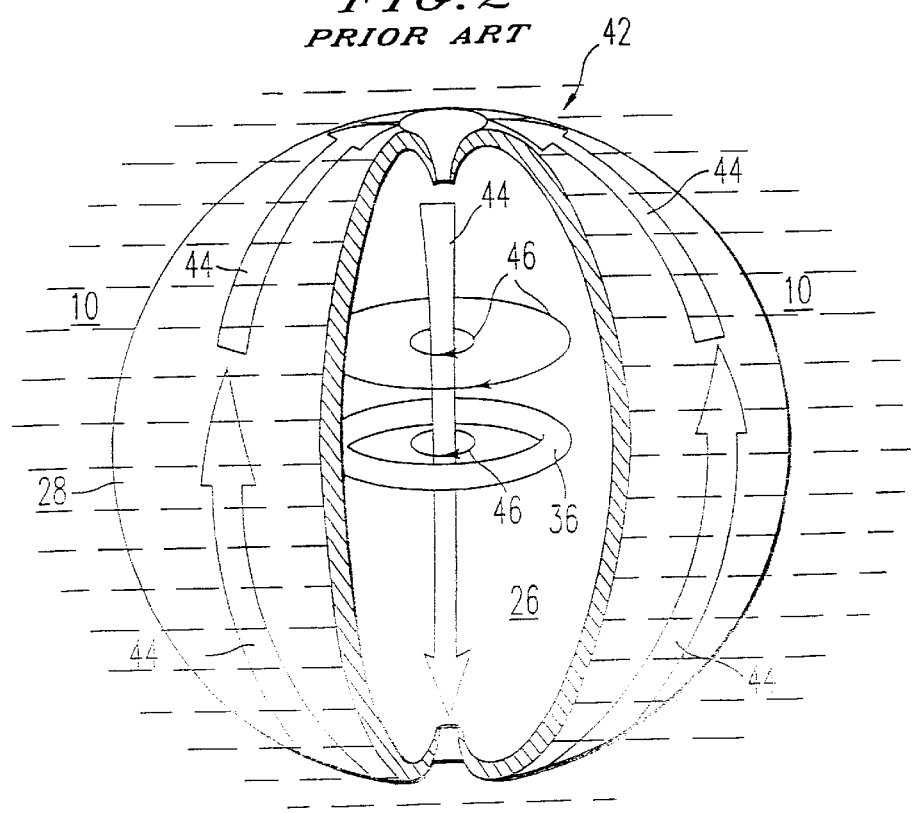
Figure 3:
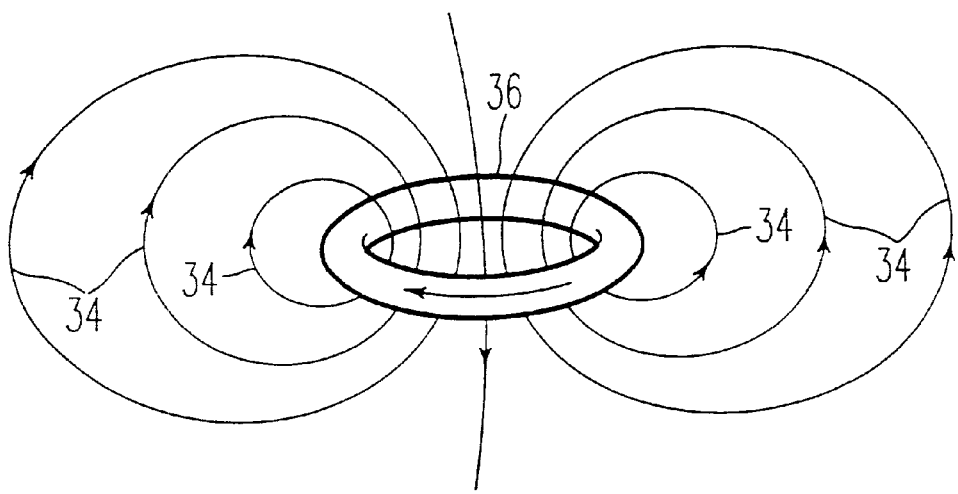
FIGS. 3 and 4, also reproduced from U.S. Pat. 4,023,065, provide a more detailed view of the inner toroidal kernel of the compound plasma configuration (PMK)
Figure 4:
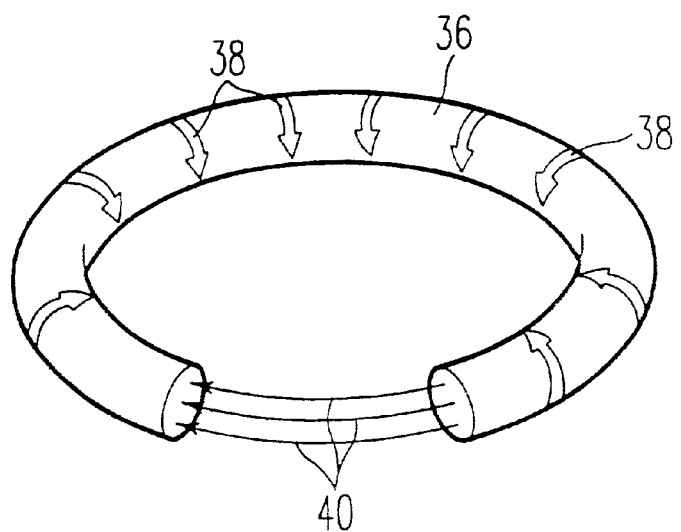
Figure 6:
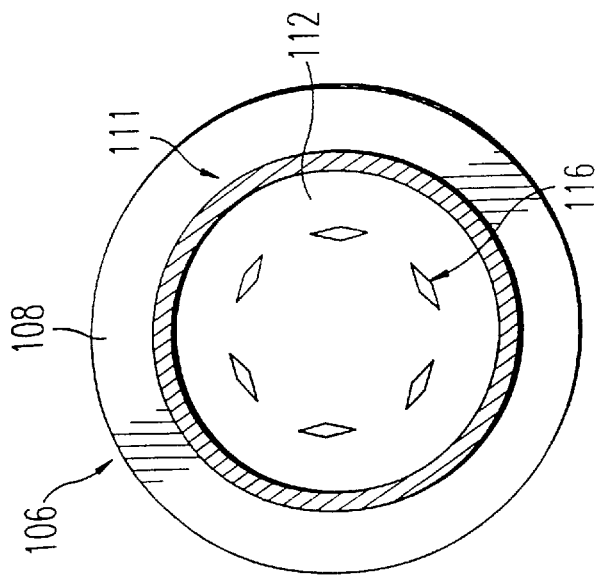
FIG. 6 is a view of the formation end of the source.
Figure 7:
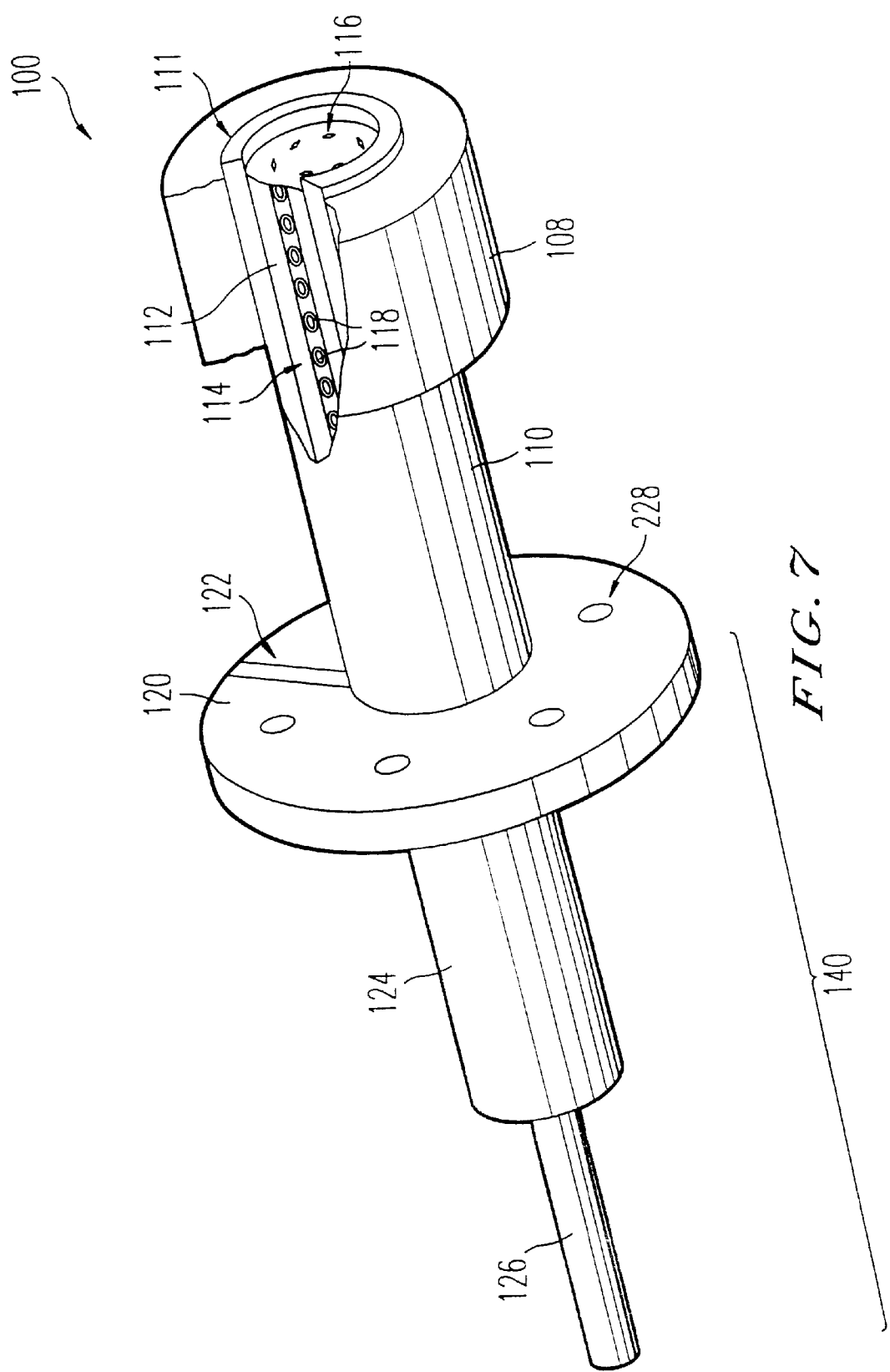
FIG. 7 is a cut away side view of the source.

The compound plasma configuration is produced at the formation end 106 of the source 100. An end on view of this formation end is shown in FIG. 6. The outermost ring is an optional insulating support cylinder 108. Moving toward the center the next ring in represents an annular electrode 111. Continuing inward, the next ring represents insulation 112, which is strong, rigid, and completely fills the volume within the conducting cylinder 110 and within which is embedded a helical conductor 114, both of which are shown in FIG. 7. Protruding from the helical conductor 114 through the insulation 112 are a plurality of pins 116. Also protruding through the insulation is the annular electrode 111 which is electrically connected to the conducting cylinder 110.

FIG. 7 is a cut away side view of the source 100. The generally cylindrical helical conductor 114 is composed of a plurality of equally spaced wires 118, each wire forming a similar helical path. Preferably, the helical conductor is composed of at least three wires, most preferably at least 5 wires. These individual wires 118 may have an insulating coating which may be different from the insulation 112 within which the helical conductor 114 is embedded. The wires 118 together each traverse the full length of the helical conductor 114 in the heliform manner described, and then constrict into a straight axial bundle 113, illustrated in FIG. 8, in the region beyond the termination of conducting cylinder 110 at the attached conducting support disk 120. The axial bundle 113 is within and coaxial with insulating tube 124, thus allowing axial magnetic flux produced by the helical conductor 114 during operation to link together around the conducting cylinder.

The conducting cylinder 110 is electrically connected to a conducting support disk 120, which may optionally have a slit 122 cut through it to help suppress currents induced by axial magnetic flux. Conducting support disk 120 has fastening holes 228 for fastening the coaxial mounting bus 102 to the source 100. Extending through the conducting cylinder 110, through the support disk 120, and out, is an insulating tube 124 within which an extension of the axial bundle 113 attach to connector rod 126. The insulating tube may form part of the insulation 12 within which the helical conductor 114 is embedded. Extending out from the insulating tube 124 is a connector rod 126. The connector rod 126 is electrically connected to the axial bundle 113, and therefore electrically coupled to the helical conductor 114.

Figure 8:
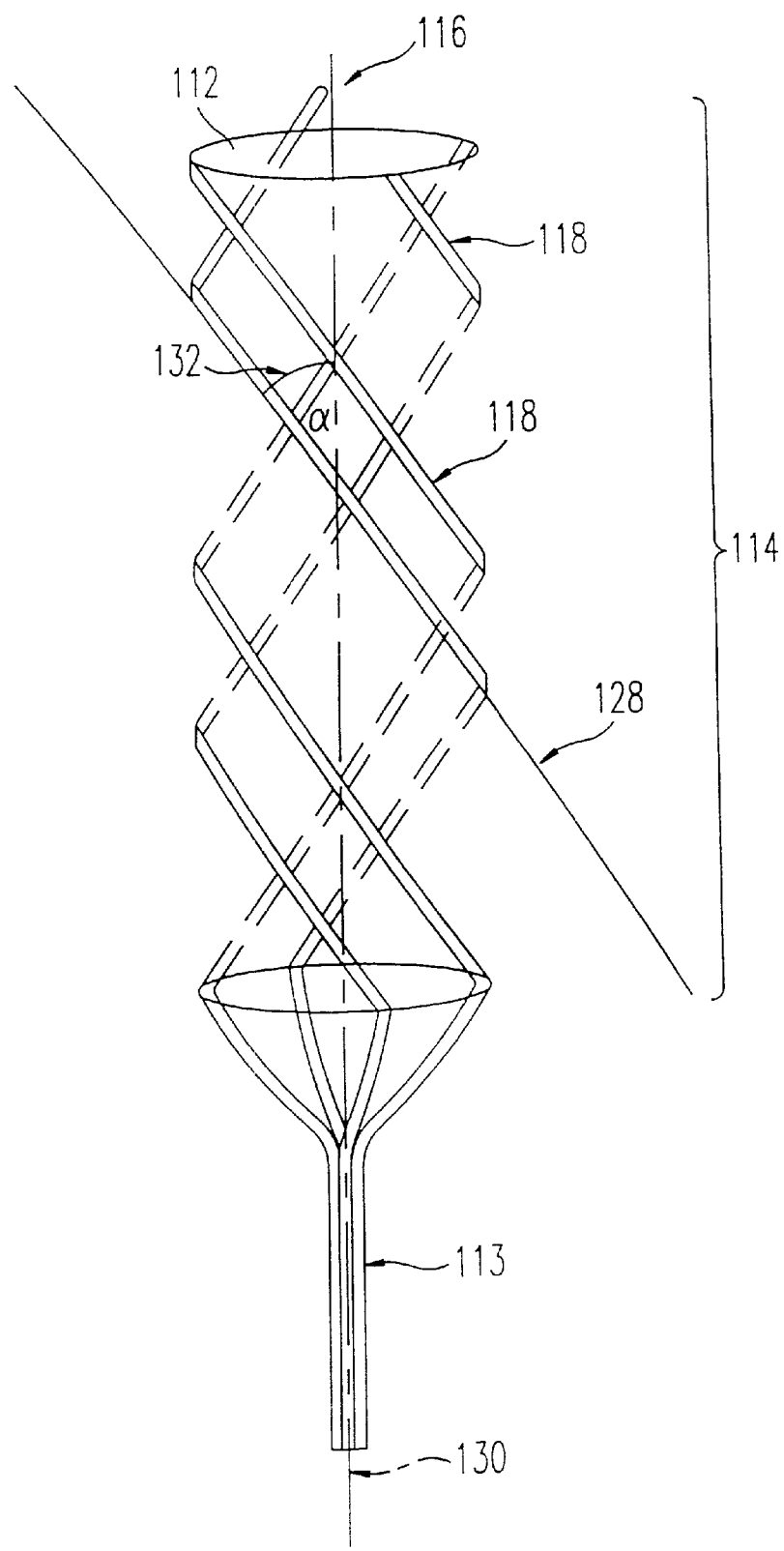
FIG. 8 is a magnified illustration of the helical conductor portion of the source.

FIG. 8 is a magnified illustration of a helical conductor 114. As illustrated, the wires 118 form one or more revolutions around the axis 130 of the helical conductor 114, and a tangent 128 to the wires forms an angle α 132 with the axis 130 of the helical conductor 114. The angle describes what is known in the art as helicity. Generally, helicity is low so that this angle would normally be below 30 degrees, preferably 10–30 degrees. This allows for PMKs to be formed with less residual velocity and better energy efficiency. However, this may sacrifice source life; the magnetic stress can be quite high since the helical conductor will suffer net strong radial compression. By setting the helicity to 45 degrees, the source currents will tend to be more force-free, relieving radial stress, and generally leading to a longer useful life and the capacity for higher loadings, i.e., high power. With this choice of helicity, push-off velocities can be on the order of ten kilometers per second in STP air, leaving the PMK with less total internal energy. For forming a PMK with more kinetic energy, the angle is preferably 30–80 degrees. The outward radial stress of high loadings on conducting cylinder 110 generally is well tolerated with a choice of conducting materials and the support of support cylinder 108. FIG. 8 also illustrates a cylinder of the insulation 112 which would be inside the helical conductor 114 and the axial bundle 113.

The insulation 112 inside of the source may completely fill the interior of the conducting cylinder 110 and encase the helical conductor 114. For materials used for a more expensive version of this source, the insulation 112 inside of the source may be filled with a strong, high temperature nonporous ceramic with resistance to mechanical shock and plasma flux, which fills the interior of a refractory conducting cylinder 110 and embeds a refractory helical conductor 114. One suitable candidate for such conducting medium is pure boron metal. For highly loaded fusion applications the refractory conducting media may be composed of the purified isotope, boron 11 ($^{11}$B). The choice of material used in the annular electrode 111 includes using the same conducting material as the conducting cylinder 110. Likewise, the pins 116 may be made of the same material as the helical conductor 114 by extending the wires 118, with any insulation removed, for a short distance beyond the insulator 112. For materials used for a less expensive version of this source, see the Example.

Figure 18:
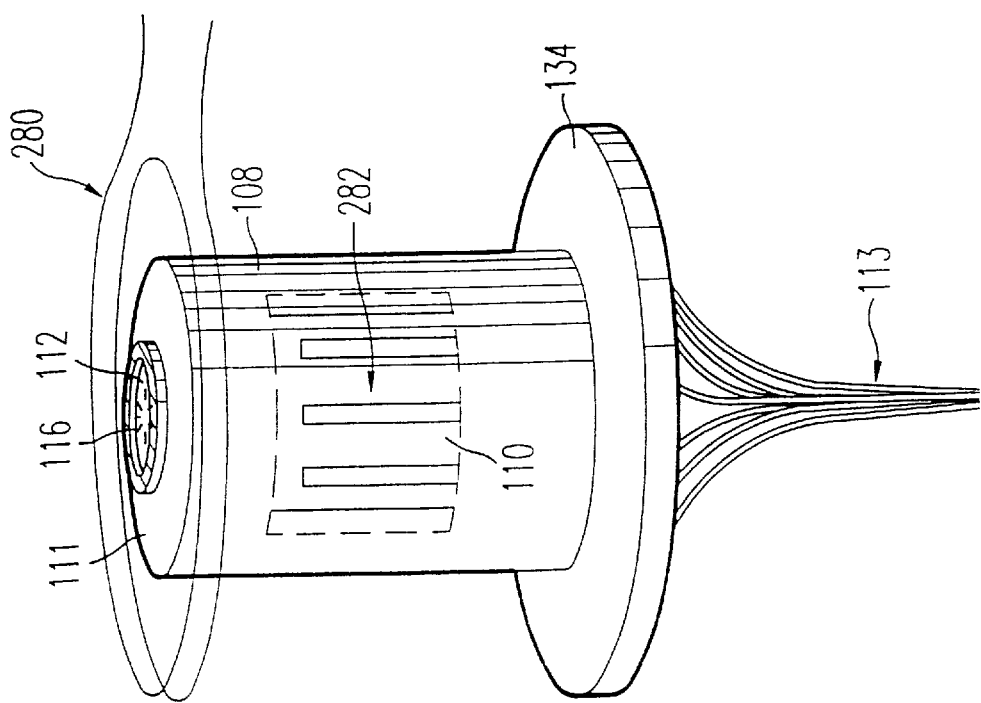
FIG. 18 is a perspective illustration of a source.

FIG. 18 shows an alternative embodiment of the source 100. A pinching coil 280 may be placed coaxially in the plane of the electrodes or just above the source 100, and can be used to pinch off and separate the compound plasma configuration as formation has finished, in the region where plasma sheath 192, illustrated in FIG. 12h, would be attached to the annular electrode 111. This may allow for the reduction of contaminants from the pins 116 or annular electrode 111 from entering the forming PMK. Furthermore, this pinching coil may also be bowl shaped, in which case it can add additional momentum to the compound plasma configuration translating away from the source.

A section of the support cylinder 108 which would normally be present has been cut away (dotted line) in FIG. 18 in order to illustrate flux slots 282 and conducting cylinder 110. The flux slots 282 may be formed in the conducting cylinder 110 to provide flux produced by the helical conductor 114 an alternate opening to more freely link by reentering above the conducting disk 134.

Figure 9:
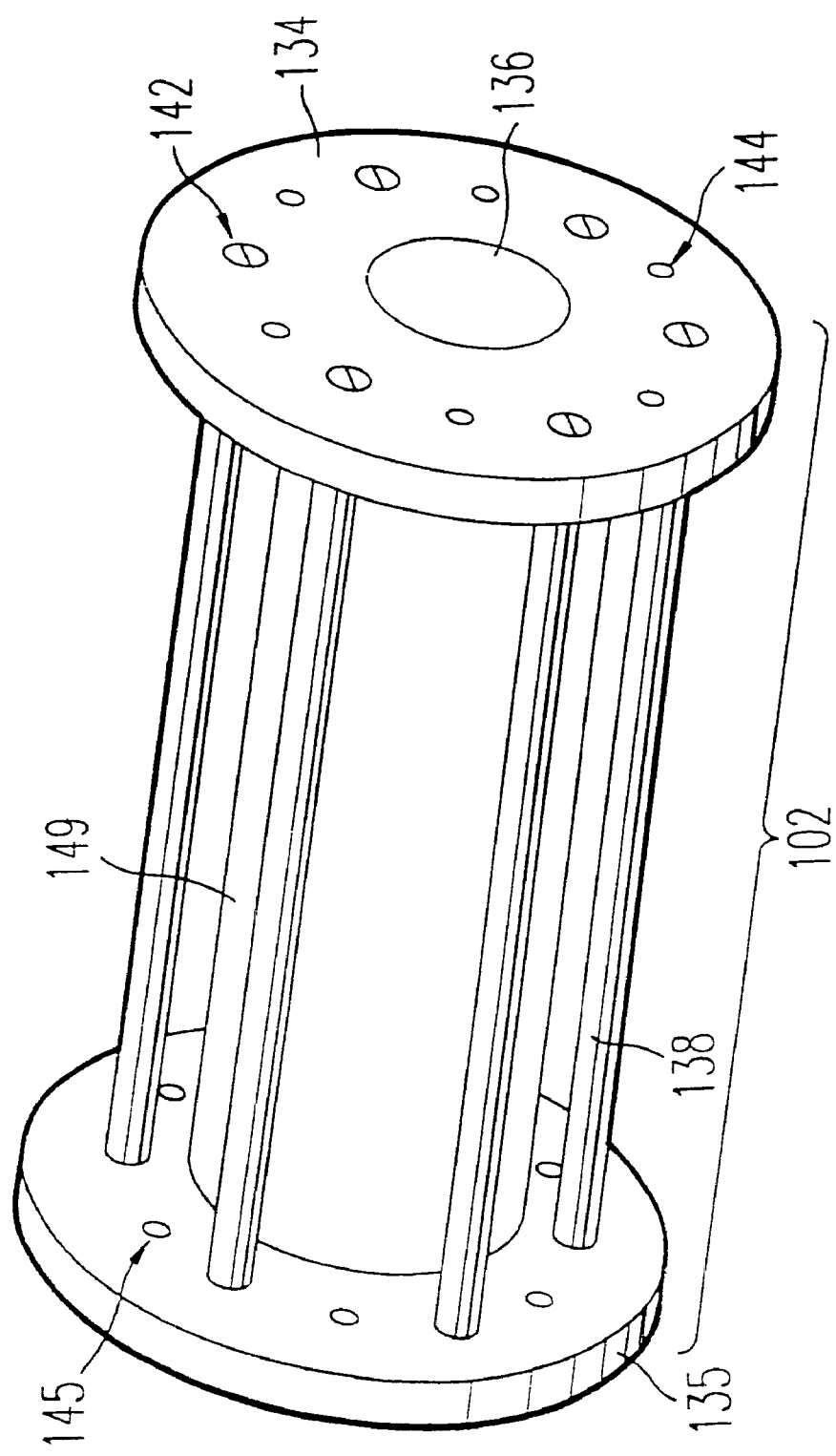
FIG. 9 is a perspective illustration of the coaxial mounting bus.

A perspective of the coaxial mounting bus 102 is illustrated in FIG. 9. The coaxial mounting bus functions to electrically couple the source 100 and the impulse circuit 104, without interfering with magnetic fields produced by the source 100 during operation. The ends of the coaxial mounting bus 102 may be a front conducting disk 134 with a front hole 136 in the center, and a rear conducting disk 135 with rear hole 137. These conducting disks 134 and 135 are connected together by a plurality of conducting support rods 138. The support rods 138 electrically and mechanically couple the conducting disks 134 and 135, without inhibiting the linking of magnetic flux produced by the source 100 during operation. The source 100 may be attached to the coaxial mounting bus 102 and axial center pin 147 by fastening the support disk 120 to the front conducting disks 134, as illustrated in FIG. 5. This electrically couples the conducting cylinder 110 to the coaxial mounting bus 102. The rear conducting disk 135 is electrically coupled to the impulse circuit 104. The insulating tube 124 and connector rod 126 of the back end of the source 140 passes; through the front hole 136 in the front conducting disk 134 and within the axial center insulator tube 149. As also illustrated in FIG. 5, the connector rod 126 can be electrically coupled to the impulse circuit 104 via the axial center pin 147, for example, using a swage connector 151. The electrical coupling of the axial center pin 147 can pass through the hole 137 in the rear conducting disk 135 and electrically connect to the impulse circuit 104. The front conducting disk 134 may also have a plurality of holes 142 for. attachment of the support rods 138, as well as a plurality of fastening holes 144 for attachment to the support disk 120. For electrical coupling to the impulse circuit 104, the rear conducting disk 135 may have fastening holes 145 for attachments to electrically couple to the impulse circuit 104. The rear conducting disk may also have holes 143 for attachment of support rods 138. In FIG. 5 axial insulator tube 149 has been omitted in order to make visible those elements which would otherwise be hidden, such as the axial center pin 147, the hole in the rear conducting disk 137, and the swage connector 151.

Figure 10:
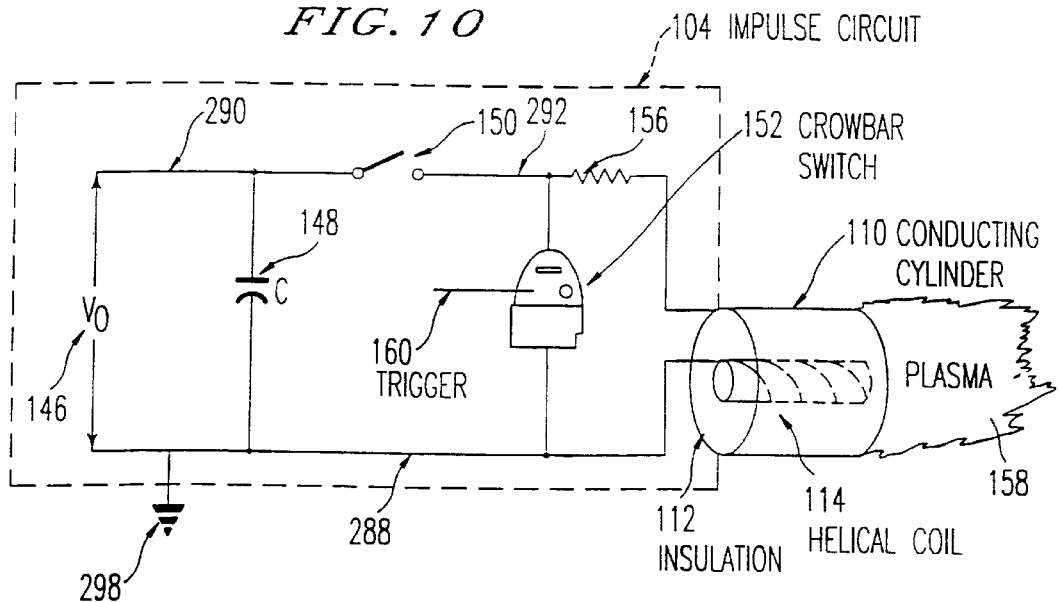
FIG. 10 is a schematic illustration of the impulse circuit.

The impulse circuit 104 is schematically illustrated in FIG. 10. The impulse circuit 104 contains circuit elements connected through a parallel plate transmission line, which is composed of a ground plate 288, a capacitor plate 290 and a source plate 292. A parallel plate transmission line is suitable for high power applications, or alternatively, a bundle of coaxial cables could be substituted for the parallel plate transmission line. The ground plate 288 is continuous and connects all circuit elements and ground 298. The high voltage plate consists of two pieces, a capacitor plate 290 and a source plate 292. The capacitor plate 290 and source plate 292 may be electrically connected through a fast-rise high current firing switch 150. The impulse circuit 104 has a power supply 146, which is connected across the capacitor plate 290 and the ground plate 288. The capacitor plate 290 is connected to the high side of capacitor bank 148 and the high side of the firing switch 150. The ground plate 288 is connected to the ground side of the capacitor bank 148 and each of the elements connected to the source plate 292. The source plate 292 connects the low voltage side of the firing switch 150 to the high voltage side of the crowbar switch 152, and is electrically coupled to the source 100 through the coaxial mounting bus 102. The low side of the crowbar switch 152 and the conducting cylinder 110 are electrically coupled coaxially to the ground plate 288, the latter via axial center pin 147 optionally, along the electrical coupling between the high voltage side of capacitor bank 148 and the capacitor plate 290 may be a fuse 156. FIG. 10 also includes plasma 158 produced during operation.

Figure 11:
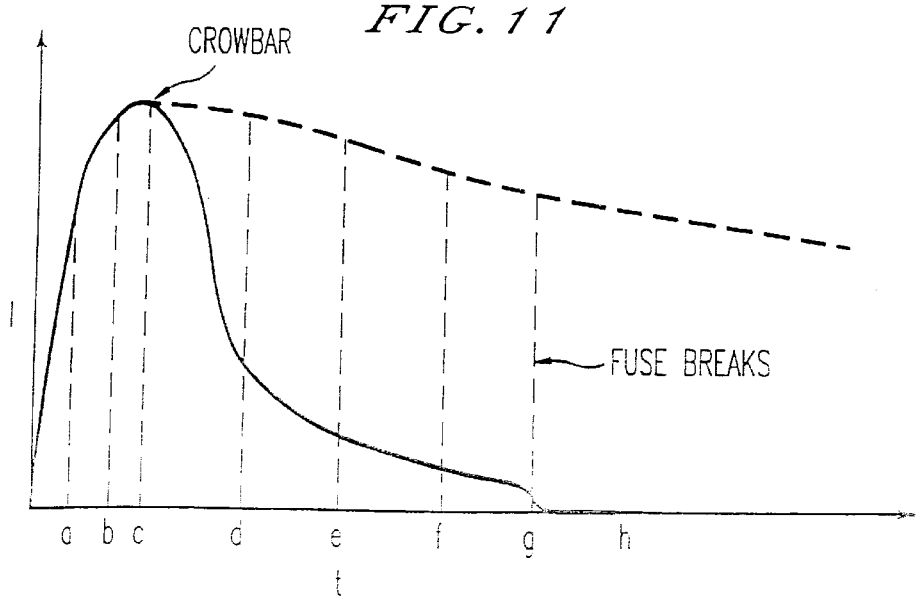
FIG. 11 is a graphical diagram illustrating current generated by the impulse circuit versus time.

The impulse circuit is principally a modified LC circuit, for the purpose of achieving a rectified current waveform. This may be achieved through the use of crowbar switches or by balancing the inductance and capacitance of the circuit against the inductive load of the forming plasma. The capacitor bank supplies stored energy in the form of charge at a high potential to drive high current levels to the source and developing compound plasma configuration. The low inductance parallel plate transmission line, and low inductance circuit elements, including the high current switch, allow the total stored charge to drive a fast rising current pulse through the source and developing compound plasma configuration. At peak current, the circuit energy is stored magnetically in proportion to the distributed inductance of the circuit elements. More of the circuit inductance may be concentrated in the forming PMK during its maturing stages of development. This will have the effect of retarding the current of the circuit, producing a waveform in which the current is depleted more quickly, as shown in FIG. 11. Although the current may be dropping with time, the effective energy stored within the increasing inductive load of the maturing PMK continues to increase. Near the peak of the current pulse, the crowbar (shorting) switch, or bank of such switches, is used to shunt the current across a transmission line between the capacitor bank and the remaining circuit components. This procedure traps or locks the circuit energy in the magnetic (high current) mode, thus thwarting the loss of magnetic energy from the maturing compound plasma configuration.

Shunting the current across the transmission line between the capacitor bank and the remaining circuit components hinders circuit current reversal, or ringing, by inhibiting the circulating current from recharging the capacitors, in conjunction with the increasing inductance of the forming PMK, significantly extending the lifetimes of the capacitors. The current wave form is almost lightning-like with a very fast rise time or leading edge and followed by a monotonically decreasing decay time, where the rate of drop decreases due to the rising inductance load of the maturing compound plasma configuration.

FIG. 11 is a graphical diagram illustrating current generated by the impulse circuit versus time. As used in this application, bactrian-shape means exactly the shape of the current versus time curve of FIG. 11. The letters on the time axis correspond to the formation stages of the compound plasma configuration illustrated in FIGS. 12a through 12h. Once the capacitor bank has been charged, the firing switch is closed, allowing current to flow through the impulse circuit, and the source, breaking down the fluid and forming a plasma annulus between the annular electrode and the pins. This drives current through the helical conductor, through the pins, through the conducting cylinder, as well as through the plasma present between the pins and the annular electrode. The current which passes through the helical conductor also generates and partitions magnetic fields, both an axial or solenoidal field in the z direction along the axis and within the volume of the helical conductor, and an azimuthal field within the volume between the helical conductor and the conducting cylinder. The axial field generated within the helical conductor extends outwardly from both ends of the helical conductor, and links externally to the conducting cylinder. At one end, this magnetic flux passes through coaxial mounting bus and at the other end it passes outward through a hole defined by the pins and the inner rim of the plasma annulus. Essentially, this flux does not cut the surface of the plasma annulus or the conducting cylinder. The azimuthal magnetic field exerts pressure on the conducting cylinder, the helical conductor and the plasma annulus and its radial current, inflating the plasma to initiate formation of a series of stages of PMK formation, to produce a compound plasma configuration, and illustrated in FIGS. 12a through 12h.

The impulse circuit described here lies at a low level of energy and peak power in comparison with the far higher range of energy and peak power currently used in the field. Furthermore, there are Matx generators, and inductively driven pulse generator, for example, technology which may be used to drive a suitably scaled source.

For very high energy cases, conventional fuses or delayed inductive opening switches may optionally be employed to extinguish the remaining current and isolate the source from the newly formed PMK late in the discharge, as indicated in FIG. 11. Such a device may also be employed with a resistive bypass. This will have the effect of reducing the current after energy transfer into the forming compound plasma configuration. Consequently, there may be a reduction in the amount of blow off plasma and therefore less wear on the source.

The compound plasma configuration of the present invention comprises a kernel 36, a vacuum field region 26, and a mantle 28, as mentioned above, and may be established in the same type of gaseous environments as described in the earlier referenced patents of the same inventor. However, the unique formation method and apparatus of the present invention provide the resulting PMK with different structural characteristics than that of the previously disclosed PMKs. The present invention has a rather small volume between the pins and the annular electrode, so the energy of the circuit is deposited initially in a small volume. Consequently the present invention has very high power density. In contrast, the previous devices deposited their energy across a large volume, resulting in low power density. The PMKs formed by the present invention gain higher conductivity faster, as well as more energy quickly, because the power density is so concentrated.

A detailed cross section of the mantle 28 is shown in FIG. 13 and 13B. The cross section of the mantle can be viewed as having two principal sections, when surrounded by fluid 10, rather than a plasma. The innermost section is the ionized region 166 and the outer section is the weakly ionized region 168. When formed in air, each region of the mantle has layered plasma regimes which form a radial gradient in the mantle plasma, and is arranged in descending order from highest energy (innermost layer) to lowest energy (outermost layer). When formed in an inert gas which does not form molecules, layer differentiation is simpler.

The ionized region has a sharp edge 170 which is itself composed of a wider outer (vacuum region side) predominately ion layer 172 and a thinner inner (plasma side) predominately electron layer 174, also shown in the magnified view within FIG. 13. This sharp edge has a boundary which is nearly a perfect step function from mantle 28 to a vacuum field region 26. It acts as a close approximation to the results anticipated under the ideal of a step function. This boundary may be slightly diffuse, in a degraded PMK, due to the presence of impurities such as dust, poor formation or nearness to the end of the lifetime of the PMK.

Continuing outward from the electron layer 174 is a hot layer 176, a photo ionized plasma 178 and finally a divergence layer 180. The divergence layer 180 is the layer farthest from the kernel 36, into which the majority of the fully ionizing radiation from the kernel can penetrate. The bulk of the ionizing radiation from the kernel plasma is absorbed in the divergence layer 180 due to the influx through the weakly ionized region 168 by diffusion of the excited high capture cross section neutrals.

The weakly ionized region 168 has an innermost photo excited layer 182, and a mixed plasma fluid edge 184. This layer may contain ionized molecules and is enclosed by the fluid 10, such as a gaseous atmosphere.

FIGS. 12a through 12h illustrate the inflation sequence of a plasma to form a compound plasma configuration (PMK). The formation sequence, once properly triggered and set under the proper conditions, as taught by the invention, proceeds automatically. FIG. 12a illustrates the triggering stage of PMK formation, showing an initial plasma annulus 186, with diverging solenoid field 188 protruding through a central hole 190 in the plasma annulus 186. The plasma annulus forms between the pins 116 and the annular electrode 111, neither of which are shown in FIGS. 12a through 12h, for clarity. The plasma annulus is formed when an impulse current is initially fed to the source 100.

FIG. 12b illustrates the plasma ballooning stage of PMK formation, formed by the forces of the azimuthal field 198 upon the plasma annulus 186. This ballooning stage is similar to the plasma focus, which is well known by artisans skilled in the art of plasma physics, except that the axial magnetic field 196 is trapped within the newly formed central channel 194, which prevents pinch-off of channel 194 by compression due to the surrounding azimuthal field 198. Therefore, in the plasma ballooning stage, a plasma sheath 192 and central channel 194 are formed from the plasma annulus 186. The current passing through the source 100 and the plasma annulus 186 generate an axial magnetic field 196 which threads through a central channel 194. An internal azimuthal field 198 is formed which fills the plasma cavity 199 and impinges upon the facing surfaces of the plasma channel 194 and plasma sheath 192. Both fields produce pressure against the surface of the central plasma channel 194. In the region of pins 116 at the terminus 195 of the central channel 194, the plasma remains resistive and turbulent during the formation, allowing some mixing of the azimuthal 198 and axial fields 196. This mixing drives powerful vortex flows in the plasma, which can erode the pins 116. By making the pins 116 blade-like with their edges aligned with the flow of the vortex, a reduction in drag and ablation may occur.

FIG. 12c illustrates the linear Z-pinch stage of PMK formation. In this stage, the plasma sheath 192 continues to inflate, and the central channel 194 elongates. The elongation of the central channel 194 with its attendant high current and azimuthal field 198 and trapped axial field 196 resembles the stabilized classical linear Z-pinch. The plasma cavity 199 continues to expand rapidly, mostly by growing in length, as long as magnetic energy is pumped into it. This stage may occur when the circuit current has reached its maximum value, approximately at 162 in FIG. 11.

FIG. 12d illustrates the helical stage of PMK formation. As the central channel 194 continues to lengthen, a second instability (M=1) comes into play, which triggers slowed kinking of the central channel 194 due to the embedded axial field 196. A nearly uniform helical winding of the growing central channel 194 produces plasma channel helix 200. As this process continues, the growing helix 200 increases the circuit inductance, reducing the circuit current level while increasing the energy of the forming PMK. A poloidal field component, illustrated by flux lines 202, which links the helix 200 together, becomes dominant. Dominance of the poloidal field 202 is associated with the tilting of the azimuthal field 198 and the increase in helicity of the central channel 194 in the region of the helix 200. The winding process, driven by magnetohydrodynamic (MHD) forces, i.e., the interaction of the conducting fluid (the plasma) with magnetic and electric fields, twists the central channel 194 into a helix 200. The lengthening and formation of this helical geometry increases the inductance and increases the local magnetic energy and pressure, which acts upon the plasma, producing a plasma sheath 192 with a more plumped profile in the neighborhood of helix 200, as illustrated at 203.

FIG. 12e illustrates the coalescent stage of PMK formation. Once multiple loops 205 of the helix 200 exist they begin to contract into the mid-plane of the helix 200. This action is driven by the MHD forces of the poloidal magnetic field 202 on the loops 205 of the helix 200 which forces the helix 200 to form a tighter coil with increased helicity. The growing helix 200 continues to contract into the mid-plane of the helix 200 and also expand outward. The vertical contraction and radial expansion forces are strongest at the mid-plane of the helix 200 due to the increased mutual flux density. Finally the loops 205 within the mid-plane begin coalescence in to an initially resistive plasma ring 204, thus forming a closed current circuit within the plasma ring 204, which is driven by the poloidal field 202 of the coalescing helix 200, as illustrated in FIG. 12f.

Once the plasma ring 204 is first formed, all of its flux, including that of the linked uncoalesced loops 205 of the helix 200, is "trapped" within the plasma ring 204 and is no longer available to drive current in the external circuit. The contraction of the helix 200 increases the magnetic coupling in the plasma ring 204, driving an EMF that accelerates the electron current of the plasma ring (azimuthal current 208 and poloidal current 211) to energetic or relativistic values, illustrated in FIG. 12g. The increase in intensity of the flux 210 results from substantial loss of the azimuthal field 198 component within the plasma ring 204. This effect also provides an EMF which drives runaway azimuthal currents 208 at the inner surface of the forming mantle, to relativistic values. These processes generate EMFs on the order of tens of kilovolts per loop. Since the closing time is on the order of many microseconds, which allows many revolutions to multiply the per loop EMF, high gamma runaway currents of many million electron volts are produced. The resulting energetic electron currents 208 and 211, on the order of ten gamma, are associated with conductivities, known as hyperconductivity, of at least about five or six orders of magnitude greater than either copper or thermal plasma conductivities. In the present invention the conductivity is preferably at least $10^{10}$ (ohm-cm)$^{-1}$, more preferably at least $10^{11}$ (ohm-cm)$^{-1}$, most preferably at least $10^{12}$ (ohm-cm)$^{-1}$. With the collapsed azimuthal field 198 and plasma of the straight section of the central channel 194, the neighboring plasma sheath 192, closes inward driven by the fluid 10. The portion of the central channel that does not coalesce into the ring current, dissipates rapidly, as indicated at 209. This completes the formation of the stable and distinctive compound plasma configuration, or PMK, 42, illustrated in FIG. 12h.

FIG. 12h illustrates the compound plasma configuration of the present invention. Both the kernel 36 and the mantle 28 have hyperconducting currents. In addition to the parts already described, the PMK 42 has two axi-symmetric polar magnetic cusps 296. These magnetic cusps 296 eject remnant central channel plasma, as well as divergence layer generated plasma, which act as polar end plugs 294.

The compound plasma configuration of the present invention is distinct from those described in U.S. Pat. Nos. 4,023,065; 4,891,180; 5,015,432; and 5,041,760 as well as those partially described by Wells et al. The distinct PMK of the present invention has a lifetime and stability orders of magnitude greater, because the currents have a dramatically higher conductivity, also termed hyperconductivity. Distinguishing features between the previous compound plasma configuration and that of the present invention include a sharp edge between the plasma and the vacuum field region 26, both between the mantle 28 and the vacuum field region 26, as well as between the kernel 36 and the vacuum field region 26. Other differences include: the ability to produce high pressure confinement fields using much higher current densities, but without excessive destabilization due to the magneto-plasma heating rates; the ability to use mantle plasma formed over its non-polar regions to capture and conserve the energy of ionizing radiation from the plasma kernel 36 to provide plasma mass, which may also act as end plugging eject a 294 to block the incursion of incoming diffusive neutrals into the polar magnetic cusps 296; and the ability to preferentially eject higher atomic number elements and thus lessen the radiation cooling rate of the mantle 28 in a sort of natural diverter action.

The energy used to form the previously made compound plasma configuration, having a very short lifetime and a similar size, as demonstrated by Wells et al, exceeds by more than 100 times that used to generate the PMK of the present invention. Furthermore, compound plasma configurations of the present invention have stable lifetimes about 1000 times longer.

Another distinguishing feature of the compound plasma configurations of the present invention are the occurrence of knock-on beams. These beams may appear to emanate from nodes on the equatorial belt of the mantle, and may be visible when they excite the surrounding fluid under certain conditions. Localized low pressure at the mantle surface may attract the nodes. For example, for a compound plasma configuration with a net drift through, the surrounding fluid, the beam emissions may occur on a low pressure or "down wind" side. These emission points may also be controlled by manipulating the localized plasma pressure along the boundary in the mantle, such as by gas puffing, magnetic impulses, etc. The trajectory of these knock-on beams, once they exit the mantle, can be controlled or shaped with the application of electric or magnetic fields. The beam currents may be measured, which is a reflection of the collisionality of hyperconducting currents of the compound plasma configuration. Furthermore, the strength and direction of the beams may be affected by the geometry of the mantle, the size and age of mantle, and the amount and type of the impurities incorporated into the compound plasma configuration.

A dense powerful pulse of hyperconducting electrons may also be derived from the deliberate mechanical breaking, or occasionally from the catastrophic natural termination, of a compound plasma configuration. This releases the hyperconducting currents as a highly compact, tangentially (to their confined orbit) escaping beam. These beams can be directed to produce powerful bursts of high intensity X-rays when they impact densely high atomic number elements, such as lead or tungsten. These high gamma electrons may also be used to transmute elements.

The boundary between the mantle 28 and the vacuum field region 26, as well as the kernel 36 and the vacuum field region 26, has a sharp edge. FIGS. 17a–17d provide graphical diagrams explaining the nature of the sharp edge at the boundary of plasma and the vacuum field.

Figure 17B:
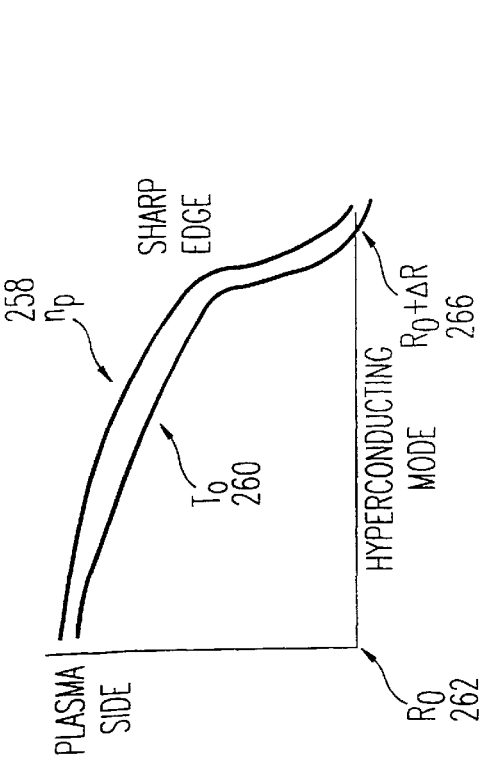
FIG. 17a through 17d are graphical diagrams of vacuum field-plasma edges.
Figure 17D:
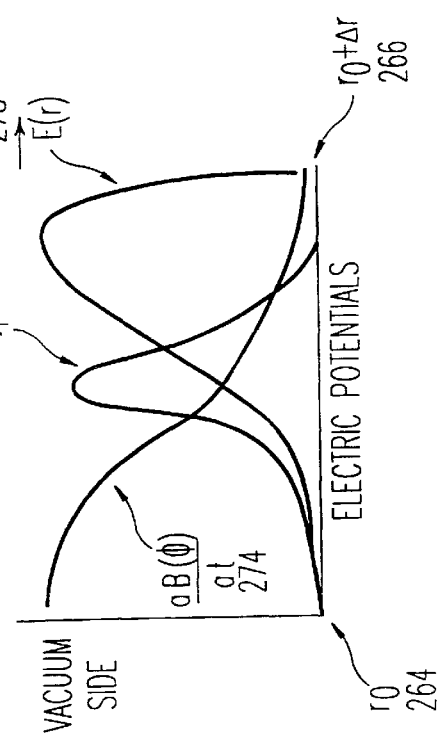
Figure 17A:
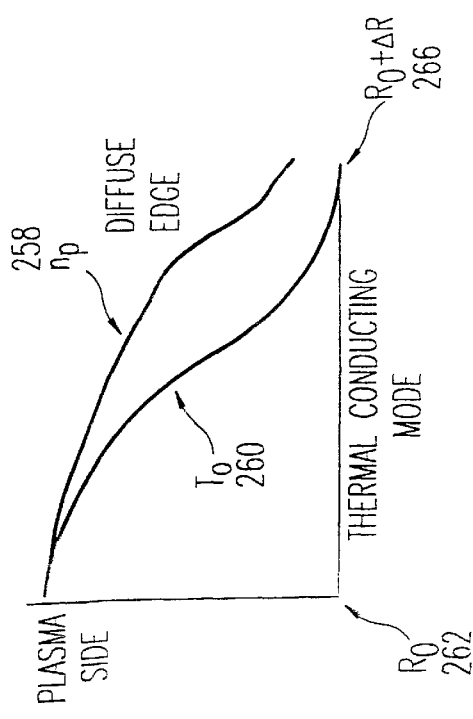

FIG. 17a shows a thermal conducting mode profile having a diffuse edge, where $T_e$ 260 is electron temperature, $n_p$ 258 is plasma density, $R_p$ 262 is the position of the peak plasma density near the boundary with the vacuum field region and r+Δr 266 is the width of the diffuse Larmor radii (overlapping) vacuum field region boundary at the extreme of the vacuum field region. This diffuse edge is associated with higher energy transport and deeper radial electron thermal gradients that are more typical of a PMK made by the prior art methods, such as partially described in Wells et al.

A compound plasma configuration of the present invention, however, has a sharp edge graphically depicted in the hyperconducting mode shown in FIG. 17b. The PMK has reduced density and electron temperature gradients as well as a much narrower Larmor edge at the extreme vacuum field region, which is associated with clamped diffusion due to a hyperconducting boundary current. The relativistic currents in the compound plasma configuration of the present invention, with their hyperconductivity, lead to the sharp edge.

Figure 17C:
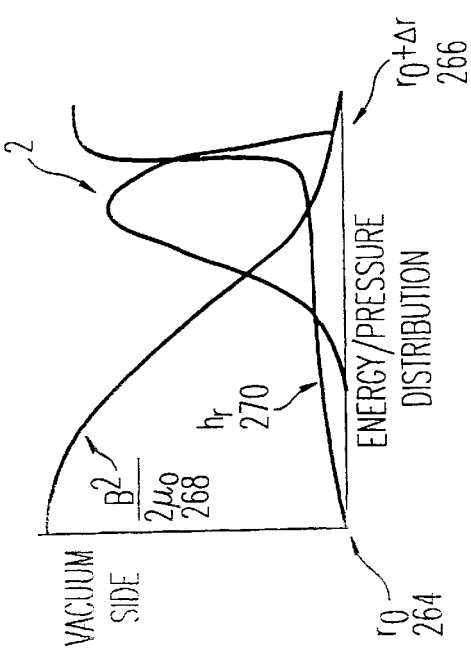

FIGS. 17c and 17d provide graphical diagrams explaining the nature of the sharp edge, and refocusing of the boundary sheet current and maintenance of its relativistic (hyperconducting) currents. FIG. 17c shows the peak magnetic energy density $B^2/2\mu_o$ 268 at the plasma edge at $r_B$ 264 which monotonically decays into the peak plasma density edge at r+Δr 266 (electron Larmor radii). The ion Larmor radii extend from the plasma edge r+Δr 266 to $R_o$ 264 in the vacuum field. The net electric field energy density $\epsilon_o E^2/2$ 272 results from the cumulative field generated by the populations of the ions and the electrons in this region. The electric potentials are shown in 17d and include a magnetic accelerating EMF $\partial B(\Phi)/\partial t$ 274 which accelerates the current whose distribution is shown as $j_r$ 276 which is centered in the notch between the peak magnetic energy density $B^2/2\mu_o$ 268 and the peak electric energy density $\epsilon_o E^2/2$ 272.

The dynamics for keeping the currents centered in this notch are as follows. For an electron flowing in the region of net higher magnetic energy density, the accelerating force provided by the magnetic accelerating EMF $\partial B(\Phi)/\partial t$ 274 exceeds the drag due to the lower particle density in that region. Thus the electron experiences a net acceleration, producing a higher B×v force as the electron experiences a nudge into the region of higher electric energy density. However, the accelerating magnetic EMF $\partial B(\Phi)/\partial t$ 274 is partially neutralized and reduced in this region by the current, and its net acceleration is diminished. Consequently, since the current drag is increased due to the higher particle density $n_r$ 270 the electron experiences a net deceleration in this region, which decreases the magnetic component of the Lorenz force and allows the electric component to predominate. Thus, the electron is nudged into the region of higher magnetic energy and lower particle density. Balance between acceleration and drag and the reduction of the net Lorenz force occurs in the mid region which is represented by the surface of the peak current density $j_r$ 276 as well as radial balance between the magnetic and electric pressure, allowing for fantastic dynamic confinement. Since knock-on electrons are driven quite directly forward when struck by high gamma current electrons, and provided with shared kinetic energy, these too may be confined within the current sheet. If the number of knock-on electrons together with the current electrons exceed the confinement capacity of its associated confining field, then the excess knock-on electrons will be expelled. In other words, these electrons or others will be sacrificed to maintain equilibrium and will fly outward, penetrating the boundary, and provide the energetic particles present in the beams, which protrude at various nodes, as discussed above. Of course, the exit of such beams could be more diffuse, and in certain blanket fluids generate a glowing ring about the plasma mantle.

Even hyperconducting electrons have collisions, but these are predominantly confined to small angle scattering, which will produce ionizing radiation. This may excite nitrogen gas, causing florescence, when embedded in a blanket fluid containing this gas. The radiation can trigger the production of ozone and various, nitrous oxides, including even nitrogen pentoxide, when blanketed by atmospheric air. Therefore, the distinct compound plasma configuration could be used by the chemical and electronics industries for lithography or chemical synthesis.

A PMK has a variety of uses. Clean fusion, for the generation of energy compactly and with exceptionally high average power densities, which will both extend and enable additional energy applications, is more fully described in the four above-mentioned patents. For fusion, the source may be scaled up to a larger size, and a gas blanket of fusion fuel may be used as the initial blanket fluid during formation. Furthermore, the pins and annular electrode may be selected from a material, such as boron 11 ($^{11}B$), which does not interfere with the fusion process. For fusion, the PMK may be formed with much more energy, for example one megajoule, using a capacitor bank charged up to 65 KV or more, and using the appropriate capacitance to meet the desired level of energy of the PMK. The PMK may be precompressed using high pressure gas with a pressure of approximately 2000–6000 atmospheres. Leveraged piston compression may then be used to reach higher pressures, such as 20 kilobars for a p-boron 11 ignition. Even higher pressures may be useful for studying stellar processes; pressures as high as 90 megabars have been achieved using explosively driven inductive discharges at the MTF project at Los Alamos/Aremis.

Figure 19:
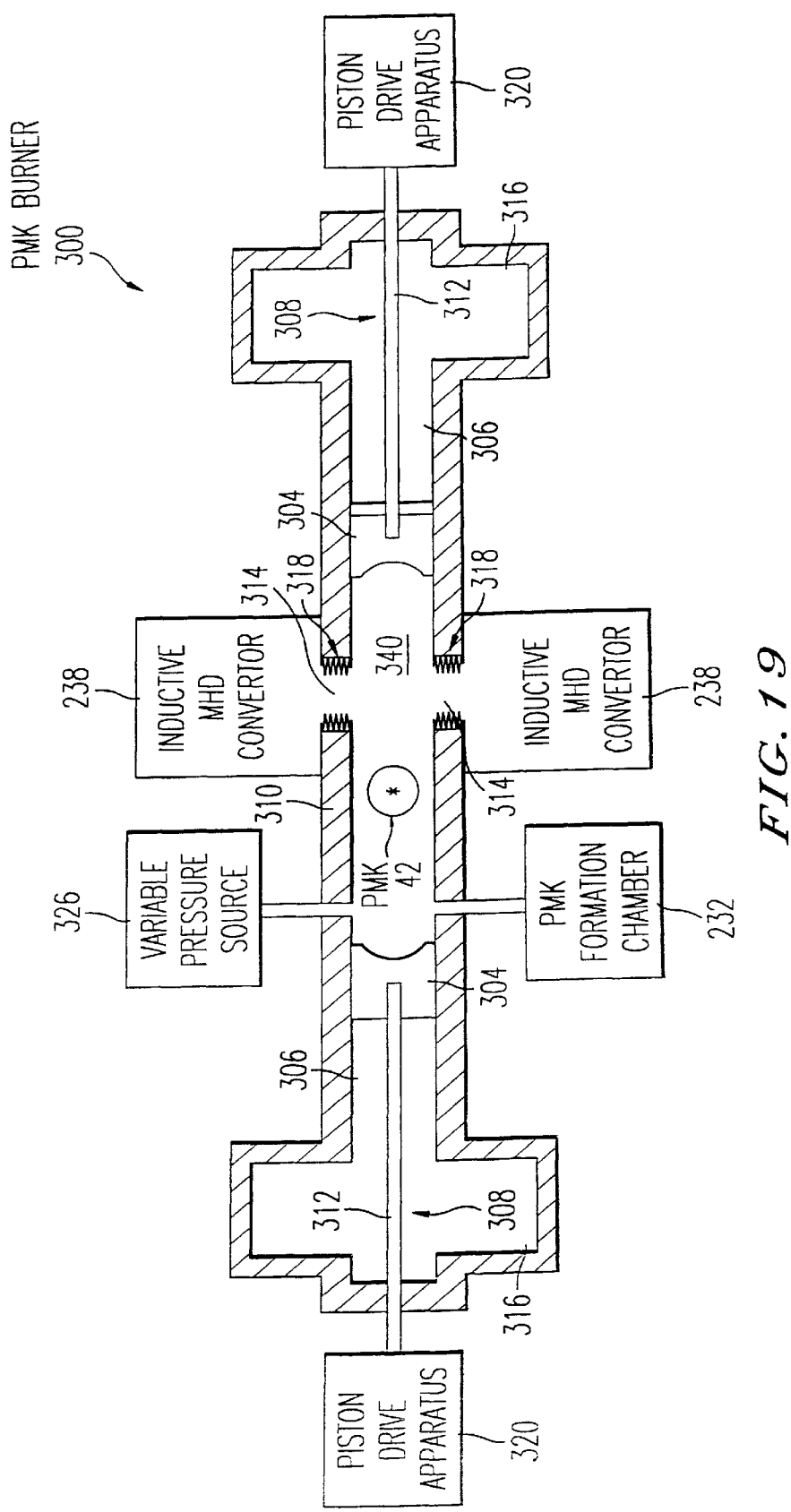
FIG. 19 shows the parts of a PMK burner according to the invention.

A PMK burner is illustrated in FIG. 19. PMK burners have been described in the above cited patents. To accomplish the requirement for pressures higher than described in previous patents, a dual piston 308 apparatus and compression cylinder 306 may be used. The volume of the burn chamber at ignition is essentially that of the combined volume of the scoops 310 when the compression heads 304 are essentially closed at peak compression. Furthermore, the massive piston rod 312 will act to inertially confine the volume of the scoops 310 for a period of time on the order of ten milliseconds, allowing an efficient burn.

Due to the small combined volume of the scoops 310, as the heads 304 withdraw, two magnetically constricted aperture outlets 314 on opposing sides are exposed. This will allow for the quick escape of the fluid in the chamber 340, now a plasma, including the remnant PMK plasma, which can be directly or indirectly used in various applications. In FIG. 16 inductive MHD convertors 238, described below, are present at the exit of the aperture outlets 314. A strong solenoidal field coil 318 lining each aperture will force the plasma to divert along the axis and avoid the wall surfaces. To avoid the erosion of the piston heads 304 and compression cylinder 306 surfaces, they can be coated with an ablatable material which will protect, and cool by sublimation, the wall surfaces of the compression heads and chamber. As the piston rod 312 and head 304 continue to withdraw, latching mechanisms can be triggered to release the compression head 304 from the piston rod 312 in the chamber 316 and disengage from the cylinder 306, allowing for their continuous or intermittent replacement.

Variable pressure source 326 can be used to precompress the PMK before inertial confinement, or in conjunction with the action of the pistons 308. The PMK formation chamber 232 is where the PMKs are initially formed in the fusion fuel, prior to delivery to the chamber 340. Furthermore, the PMKs may be precompressed prior to delivery to the chamber 304.

The actual dimensions of a PMK burner may vary based on the power output, and therefore the apparatus illustrated in FIG. 19 may vary widely in both size and load capacity. In the PMK burner pressures on the order of 20,000 atmospheres can be obtained using inertial confinement. When pressure is applied through adiabatic compression, the energy concentration of the kernel of the PMK will increase dramatically, increasing the pressure, plasma density, and decreasing the volume, resulting in an increase in temperature above critical fusion ignition temperatures. If the initial size of the PMK is large, then a sufficient quantity of fusion fuel will be present to drive a robust burn. Fusion will occur within the burner and substantial fusion energy will be released. Once fusion occurs, the fusion energy released will supply additional energy to the PMK, and the surrounding fluid, increasing the temperature and pressure of the fluid, thereby continuing the compression heating of the kernel and assuring continued burning to efficiently consume the fuel. This will assure an efficient output even in the case of non-neutron yielding fuel, such as protium boron 11 (p-$^{11}B$).

To maintain a three phase operation at 60 HZ, a battery of devices of the type illustrated in FIG. 19 may be constructed and energized sequentially. Thus, each device will provide energy output as its PMK burns, and as the PMK burns out and the fluid, now a plasma, is released, subsequent ignition and burner apparatus are started to continue generating power. Also, the rapid exchange of compression heads can be handled in the same manner as the exchange of barrels in a Gattling gun. Thus, these elements can be taken out of the duty cycle and replaced during continuous operation. The exchanged heads can be annealed, reconditioned or even replaced, allowing for long-term continuous operation.

A compound plasma configuration can be used with PMK burner to generate a highly pressurized, hot, dense, and conducting plasma which can be used to directly generate electricity in an inductive MHD process, schematically illustrated in FIG. 16. FIG. 16 is an idealized inductive MHD convertor 238 and power take-off transformer 218. A superconducting circuit 342 contains a solenoid 214 coupled to a superconducting primary coil 344 of a power take-off transformer 218. The circuit also includes a bypass switch 346 and an opening switch 348 which allows for external charging by a charger 350 of a substantial current in the superconducting circuit 342 and the charging of a substantial field in the superconducting solenoid 214. Since this current is in a steady-state when the inductive MHD convertor 238 is not operating, the output bus 220 is off. Also present is a secondary coil 352 of the transformer.

Hot plasma 212, from a PMK burner for example, is coaxially fed into a magnetically energized solenoid 214. As the plasma enters the cusp of the solenoidal field of solenoid 214, it displaces the local magnetic field laterally, compressing it against the solenoidal 214, increasing the energy of the field. This produces a driving EMF of the current of circuit 342, and effectively reduces the inductance of the solenoid 214. The current surge in the superconducting circuit 342 produces an increase in the field of the flux circuit of transformer 218, thus causing an EMF and transient pulse to form in the secondary coil 352, which is seen at the output bus 220. The energy is extracted from the hot plasma 212 by its adiabatic expansion against the magnetic field of the solenoid 214. The resulting expansion cooled plasma exits the solenoid as warm plasma 216, which can then be used to drive pulsed direct currents in a cogenerator consisting of a conducting MHD convertor, which is well known to artisans in the field of MHD technology. The inductive MHD convertor 238 has electric conversion efficiencies from 70–95%, depending on the fuel burned in the fusion process, and use of cogeneration.

The inductive MHD convertor may be used as part of a system for electric power generation. FIG. 14 is a block diagram for an electric power generation system. Fusion fuel 230, such as boron and hydrogen, is fed into a PMK formation chamber 232. The PMK is then fed first to a precompressor 234 and then a fusion compressor/burn chamber 236, which may be, for example, the PMK burner 300 described above. The hot plasma thus formed is fed into an inductive MHD convertor 238. The thermal fusion energy is converted into electricity, as well as warm plasma 216, which may be split between a conductive MHD generation 244 and a dialable (passing through magnetic choke 240) plasma jet/torch 242 for applications requiring direct thermalization. The residual deionized plasma/gas emanating from the conductive MHD generator 244 can be fed into a Sterling cycle electric convertor as represented by the steam electric convertor 246. The residual gas emanating from the steam electric convertor 246 may be recycled through the fusion compression and burn chamber 236. The residual heat collected from the generator and convertor elements of this system may be removed through a radiator 248. The direct current produced in the conductive MHD generator 244 is fed in along a separate path from the alternating current produced by the inductive MHD convertor 238 and the steam generator 246, to output bus 220.

In a similar fashion a high thrust propulsive thermal rocket engine can be made. FIG. 15 is a block diagram of such a thermal engine. Fusion fuel 230 is fed into a PMK formation chamber 232. Atmospheric gas may be used to resupply the compression blanket for both the precompressor 234 and the fusion compressor/burner 236. Simultaneously, the PMK is then fed into a precompressor 234, and then to a fusion compressor/burner 236. This allows the precompression and fusion compression burn to be carried out with air from atmospheric air intake 250, so that air will make up the bulk of the reaction mass 252 eventually expelled through the magnetic inductive solenoid/nozzle 254, which acts both as a directive thrust nozzle and inductive MHD convertor, in order to recover operating energy to drive the system. The nozzle 254 may have a superconducting solenoid similar to the superconducting solenoid 214 of an inductive MHD convertor 238, except the shape may be parabolic in order to recover some of the energy of the plasma as electricity, while allowing a substantial amount of the energy to remain in the plasma (reaction mass 252) to provide thrust.

PMKs can be accelerated with an electric or magnetic accelerator, for example, a powerfully pulsed coaxial oscillating coil. Accelerators can be used in tandem and sequentially fired or phased to coincide with the position of the PMK as it moves, further accelerating the PMK. The distinct compound plasma configuration of the present invention can also be used for cutting and welding, with the scale of the device appropriate for the welding task. For example, a rapid firing (60 HZ) PMK generator and accelerator may be used to form an energetic plasma beam for cutting or slicing.

Similarly, a PHASER (Phased Hyperkinetic Acceleration for Shock EMP Radiation) gun can be produced, by using a phased accelerator to launch hyperkinetic PMKs through the atmosphere or exoatmosphere. A hyperkinetic PMK is a PMK which is moving at a speed greater than that of a bullet fired from a gun, but slower than $1/100$ the speed of light. Such PMKs would act like encapsulated magnetoplasmoid bullets which could deliver EMP impulses to remote targets through the atmosphere. Preferably, a hyperkinetic PMK has a velocity of at least 1 km/sec, more preferably at least 5 km/sec, most preferably at least 10 km/sec. These PMKs would be held in a compressed and energetic state during transit to the target by the reaction pressure of the bow shock and ram compression due to deceleration. The bow shock would act as an extension of the plasma mantle and therefore become an integral part of a modified mantle of the flying PMK. The hyperconducting currents in the kernel and modified mantle (the bow shock plasma-vacuum field boundary) would clamp the diffusion of both particle and field flux through the inner surface of the bow shock. The kernel plasma would remain magnetically insulated until catastrophic impact with the target occurred. The EMP impulse delivered by such a device could be used for defensive or safety applications, such as the interruption of the computer control of a runaway vehicle.

A high specific thrust rocket engine, a PMK hyperdrive, can also be made as shown in block diagram form in FIG. 20. The PMK hyperdrive 338 is similar to the thermal engine 356 previously described, except the design has been changed because of the unavailability of the atmosphere as unlimited reaction mass. Fusion fuel 230 is fed into a PMK formation chamber 232, and the PMK formed is transferred to a precompressor 234, and then to a fusion compressor/burn chamber 236 to burn the fusion fuel. The hot plasma produced may then be fed into an electric power generator 354, to produce electricity. The electric power generator 354 may have any number of stages describe for electric power generation in FIG. 14, such as an inductive MHD convertor 238 and a conductive MHD generator 246. Preferably the electric power generator would remove as much heat from the fusion burn as possible. The electric power 336 produced by the electric power generator 354 can be distributed as needed.

Parallel to the electric power generation, the reaction mass 330 is converted into plasma 252. The reaction mass is fed into a PMK formation chamber, along with spent fuel from the electric power generator 354. The PMK formed in the PMK formation chamber 232 may then be fed to a precompressor 234 and then accelerated in the PMK accelerator 332. The PMK may then be sent out the nozzle 334. The nozzle 334 may have a superconducting solenoid similar to the superconducting solenoid 214 of an inductive MHD convertor 238, except it would have a parabolic shape. The PMK could be electrically disrupted, such as by turbulence, to recover some of the electrical energy of the plasma as electricity, while allowing a substantial amount of the kinetic energy to remain in the plasma reaction mass 252 to provide thrust.

The PMK hyperdrive uses a combination of power from a closed cycle electric PMK power generator and then uses that power to produce powerful continuous acceleration of PMKs for thrust. The magnetic energy may be recovered inductively as the accelerated PMKs; are vectored into a thrust producing beam. Such a high specific thrust or (hyper thrust rocket engine) could be used for transportation between planets and to and from planetary surfaces which contain little or no atmosphere.

Having generally described this invention, a further understanding can be obtained by reference to certain specific examples which are provided herein for purposes of illustration only and are not intended to be limiting unless otherwise specified.

EXAMPLE

The following is an example of an inexpensive working device. The conducting cylinder is composed of 5/8" copper tubing while the helical conductor is composed of lengths of single strand 12-gauge copper electrical wire. A half-inch insulating fiberglass reinforced thin-walled plastic tube #124 which extends the full length of the distance between the annular electrode plane and the connecting rod acts as an insulating spacer between conducting cylinder and helical conductor. A vacuum potable epoxy fills the space within insulating tube and thus embeds the helical conductor. The insulating material on the 12-gauge electrical wires is excellent as a spacer between the multiple elements in the helical conductor, while the wires in the axial bundle are stripped over the length which is inserted and brazed into the connector rod. The connector rod is composed of a 3/8" brass plumbing stud. The insulating stress support cylinder which fits snugly over the conducting cylinder is a thick-walled fiberglass reinforced epoxy tube.

Five to eight pins are used, and the pins are simply the ends of the wires which form the helical conductor, stripped of any insulation. The pins are pointed in a direction which is a continuation of the helical path of the wires in the helical conductor. At the formation end of the source the epoxy is white for intense pulse tolerance, while away from the formation end of the source the protrusion of the thin walled fiberglass reinforced epoxy tube is green. The annular electrode is the end of the cylindrical conductor, protruding from the insulation.

The helix formed by each wire has approximately a single turn across the length of the helical conductor. The angle between the tangent of the wires and the axis of the helical coil is 10–45 degrees. The length of the helical conductor is a few inches. The pins each are 1–3 mm long.

The parallel plates connecting the circuit elements are composed of 1/8 inch thick copper sheets 18 inches wide, with an intervening larger insulating sheet, and are of suitable lengths to accommodate the circuit elements. The plates may have the dimensions of a foot and a half by 6 or 8 feet. Six 25 to 50 microfarad 20 KV rectangular parallel piped capacitors are attached from their cases to the ground plate and from their flat pancake insulated center pins to the capacitor plate, so that the parallel inductance of the bank can be maintained. The capacitor plate and source plate are connected to a coaxial spark gap or rail gap switch of low inductance which for atmospheric work is set for air breakdown between 7 and 12 kilovolts. Likewise, an array of 6 or 8 class A ignitrons in grounded coaxial housings are attached to the source plate by their axial bolts. The ignitrons are 50 to 100 kiloampere, 20–25 kilovolt crowbar ignitrons. These can be equally spaced along a circular perimeter which is centered on the connecting coaxial mounting bus.

The pulse trigger for the crowbar switch should be delayed from the firing of the switch to occur just before peak bank current is achieved. This timing may be adjusted to optimize performance, reliability and efficiency. A series fuse may be used to prevent capacitor failure from an otherwise catastrophic short circuit. These may be made in the form of fusible wire which links each center pin of the capacitors to the plate gap or alternately a disk composed of foil connected in the manner of a washer from the center pin to the capacitor plate. The volume of the PMK produced with this version of the main circuit is about 75 $cm^3$, about the size of a chicken egg.

Just prior to firing the source, a small prepulse may be sent through the source. In some cases when the main circuit does not fire, the prepulse appears to have created a small airborne PMK the size of a ping-pong ball, but likely with a kernel plasma of 2–3 mm diameter, judging by their approximate 10 millisecond lifetime. The prepulse is produced by a separate circuit which is identical to the impulse circuit, except the capacitance is a small fraction (1 $\mu$F) of the main bank, and there is no crowbar switch.

OPERATION OF THE INVENTION

First, a prepulse may be sent through the source to ionize the region between the pins and the end of the conducting cylinder. Tens of microseconds later, the firing switch is closed, sending the main pulse through the source. At peak current, on the order of one microsecond later, the trigger of the crowbar switch may be fired, crowbarring the circuit. The PMK is allowed to form and detach, where it is free to move within the air. Optionally, the fuse may be broken to interrupt and smother any residual current. The PMK so formed may have some kinetic energy, outward along the axis of the source.

Provisional Application Serial Nos. 60/004,287, 60/004,255 and 60/004,256, all filed on Sep. 25, 1995, as well as International Application No. PCT/US96/15474, are all hereby incorporated by reference.

Having now fully described the invention, it will be apparent to one of ordinary skill in the art that many changes and modifications can be made thereto without departing from the spirit or scope of the invention as set forth herein.

What is claimed as new and is desired to be secure by Letters Patent of the United State is:

1. A system for producing a plasma, comprising:
   a source connected to an impulse circuit,
   wherein said source comprises:
   an annular electrode connected to a conducting cylinder,
   an insulator in said conducting cylinder, said annular electrode protruding through said insulator,
   a helical conductor embedded in said insulator, and
   conducting members protruding from said helical conductor through said insulator, and
   wherein said impulse circuit is configured to drive a current through said source to form said plasma between said conducting members and said annular electrode.

2. The system of claim 1, wherein said source further comprises an insulating support cylinder surrounding said conducting cylinder.

3. The system of claim 1, wherein said helical conductor has a helicity greater than 30°.

4. The system of claim 1, wherein said helical conductor has a helicity less than 80°.

5. The system of claim 1, wherein said helical conductor has a helicity between 30–80°.

6. The system of claim 1, further comprising a pinching coil coaxial to said helical conductor.

7. The system of claim 1, wherein said conducting cylinder defines flux slots.

8. The system of claim 1, wherein said source further comprises a conducting support disk electrically connected to said conducting cylinder.

9. The system of claim 8, wherein said conducting support disk has a slit configured to reduce currents induced by an axial magnetic flux.

10. The system of claim 8, wherein said conducting support disk defines fastening holes.

11. The system of claim 8, further comprising a coaxial mounting bus fastened to said source via said fastening holes.

12. The system of claim 11, wherein said impulse circuit is connected to said source via said coaxial mounting bus.

13. The system of claim 12, wherein:
said helical conductor comprises a plurality of conducting elements, each conducting element forming a similar helical path,
said conducting elements traverse a length of said helical conductor in a helical manner and form an axial bundle in a region beyond said conducting cylinder, and
said axial bundle is electrically connected to said impulse circuit.

14. The system of claim 13, wherein said coaxial mounting bus comprises:
a first conducting disk connected to said source,
a second conducting disk connected to said impulse circuits, and
a plurality of rods electrically and mechanically connecting said first conducting disk to said second conducting disk.

15. The system of claim 13, wherein said axial bundle is electrically connected to said impulse circuit via a conductor passing through holes defined by said first and second conducting disks.

16. The system of claim 1, wherein said helical conductor comprises a plurality of conducting elements, each conducting element forming a similar helical path.

17. The system of claim 16, wherein said helical conductor comprises at least 3 conducting elements.

18. The system of claim 16, wherein said helical conductor comprises at least 5 conducting elements.

19. The system of claim 16, wherein said conducting elements have an insulating coating different from said insulator.

20. The system of claim 16, wherein said conducting elements traverse a length of said helical conductor in a helical manner and form an axial bundle in a region beyond said conducting cylinder.

21. The system of claim 16, wherein said conducting members are extensions of said conducting elements.

22. The system of claim 16, wherein said annular electrode is an extension of said conducting cylinder.

* * * * *